(12) United States Patent
Sato et al.

(10) Patent No.: US 6,931,379 B1
(45) Date of Patent: Aug. 16, 2005

(54) IC CARD SYSTEM AND IC CARD

(75) Inventors: Akiko Sato, Mitaka (JP); Yusuke Mishina, Kunitachi (JP); Masaru Ohki, Tokorozawa (JP); Satomi Baba, Kokubunji (JP); Yutaka Matsui, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 409 days.

(21) Appl. No.: 09/639,751

(22) Filed: Aug. 15, 2000

(30) Foreign Application Priority Data

Aug. 11, 2000 (JP) ........................................ 2000-249182

(51) Int. Cl.[7] ............................................. G06F 17/60
(52) U.S. Cl. ...................... 705/50; 380/259; 380/285; 713/201; 713/171; 713/176
(58) Field of Search ................................. 235/380, 375; 705/41, 66, 64, 67, 71, 50; 713/200–202, 171, 176; 380/228, 259, 260, 285

(56) References Cited

U.S. PATENT DOCUMENTS

| 6,209,091 B1 * | 3/2001 | Sudia et al. ................. 713/175 |
| 6,402,028 B1 * | 6/2002 | Graham, Jr. et al. ......... 235/380 |
| 6,422,459 B1 * | 7/2002 | Kawan ........................ 235/380 |

FOREIGN PATENT DOCUMENTS

| JP | 410133869 A | * | 5/1998 |
| WO | 98/50875 | | 11/1998 |
| WO | 98/52162 | | 11/1998 |
| WO | WO9852162 | * | 11/1998 |
| WO | WO 98/52162 | * | 11/1998 |

OTHER PUBLICATIONS

D. Stinson, "Cryptography: Theory and Practice", Kyouritsu Shuppan Kabushikibaisya, Chapter 6, 1997, pp. 217–220.
A. Menezes et al, Handbook of Applied Cryptography, CRC Press, 1996, pp. 433–434.
A. Menezes et al, Handbook of Applied Cryptography, CRC Press, 1996, pp. 474–475.
"Modern Cryptography", Sangyou–Tosho, 1997, pp. 184–187.

* cited by examiner

*Primary Examiner*—Pierre E. Elisca
(74) *Attorney, Agent, or Firm*—Mattingly, Stanger & Malur, P.C.

(57) ABSTRACT

An IC card that allows a service provider doing a business of loading an application into the IC card to dynamically load the application into the IC card safely after the issuance of the IC card without making a contract directly with a card issuer issuing the IC card and without establishing a communication with the card issuer. The card issuer issuing the IC card hands over an encryption key in advance to a third party other than the card issuer in order to entrust the third party with work to authenticate an application to be loaded or to allow the third party to function as an agent on behalf of the card issuer. The card issuer issues an agent certification to the third party to be used as evidence showing that the third party is an agent representing the card issuer.

2 Claims, 24 Drawing Sheets

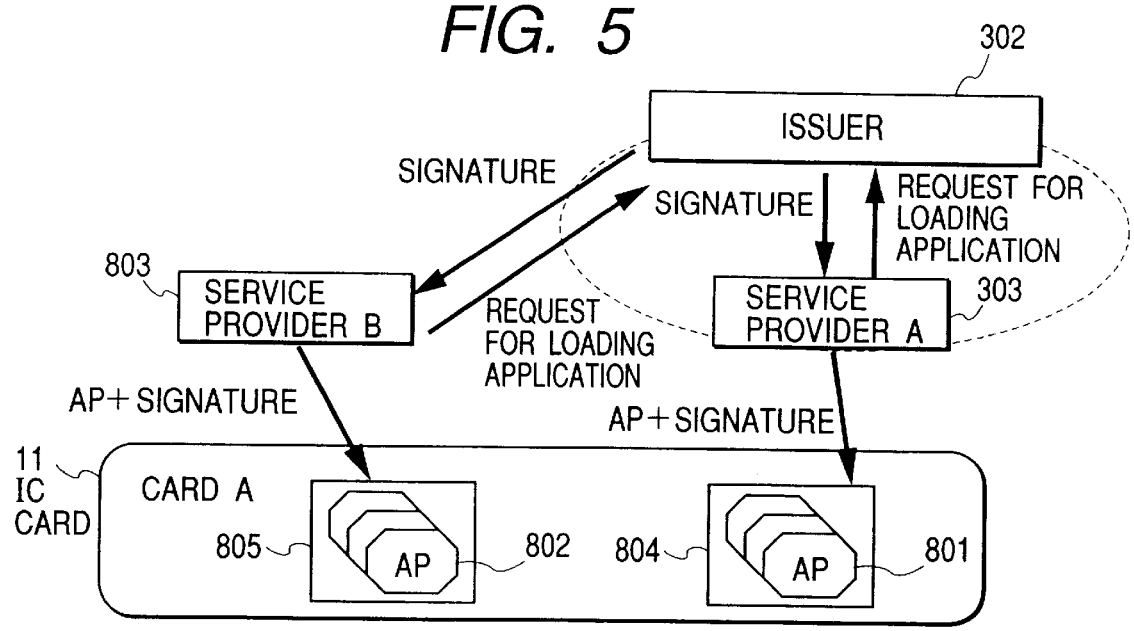
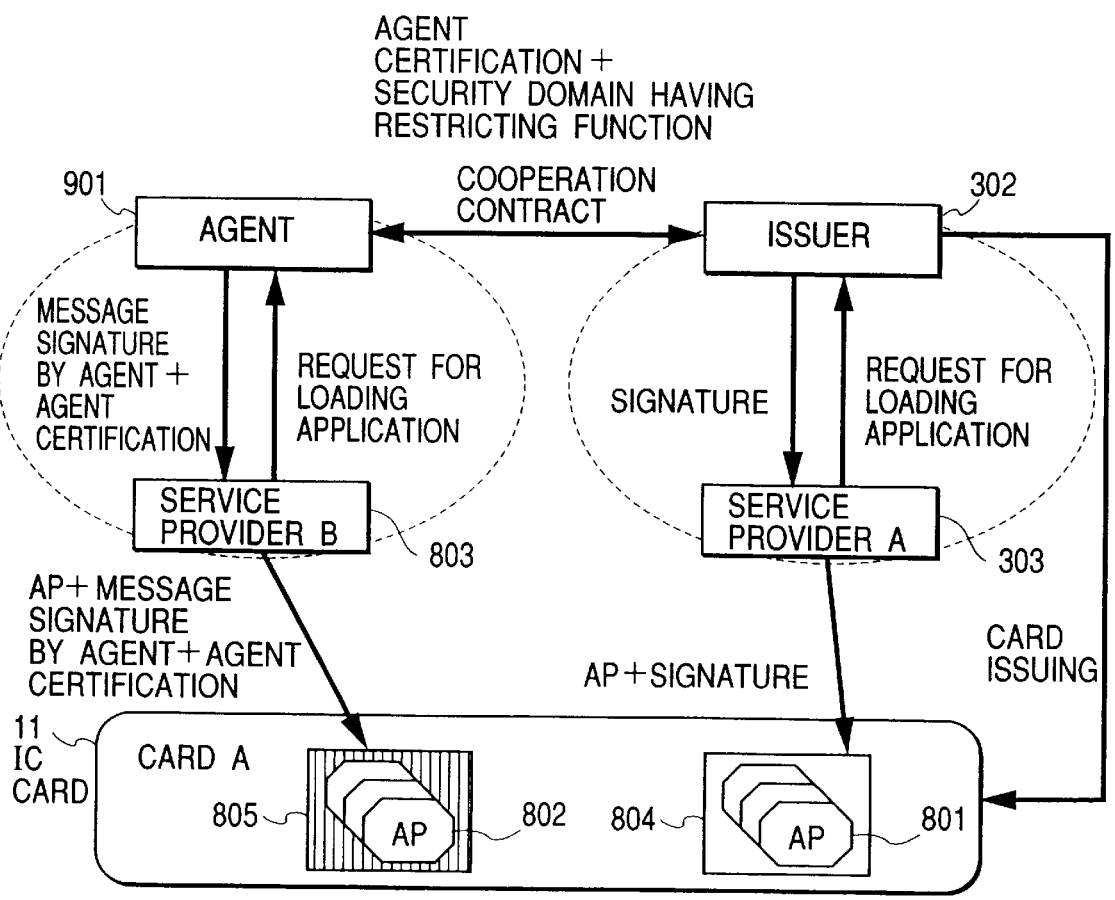

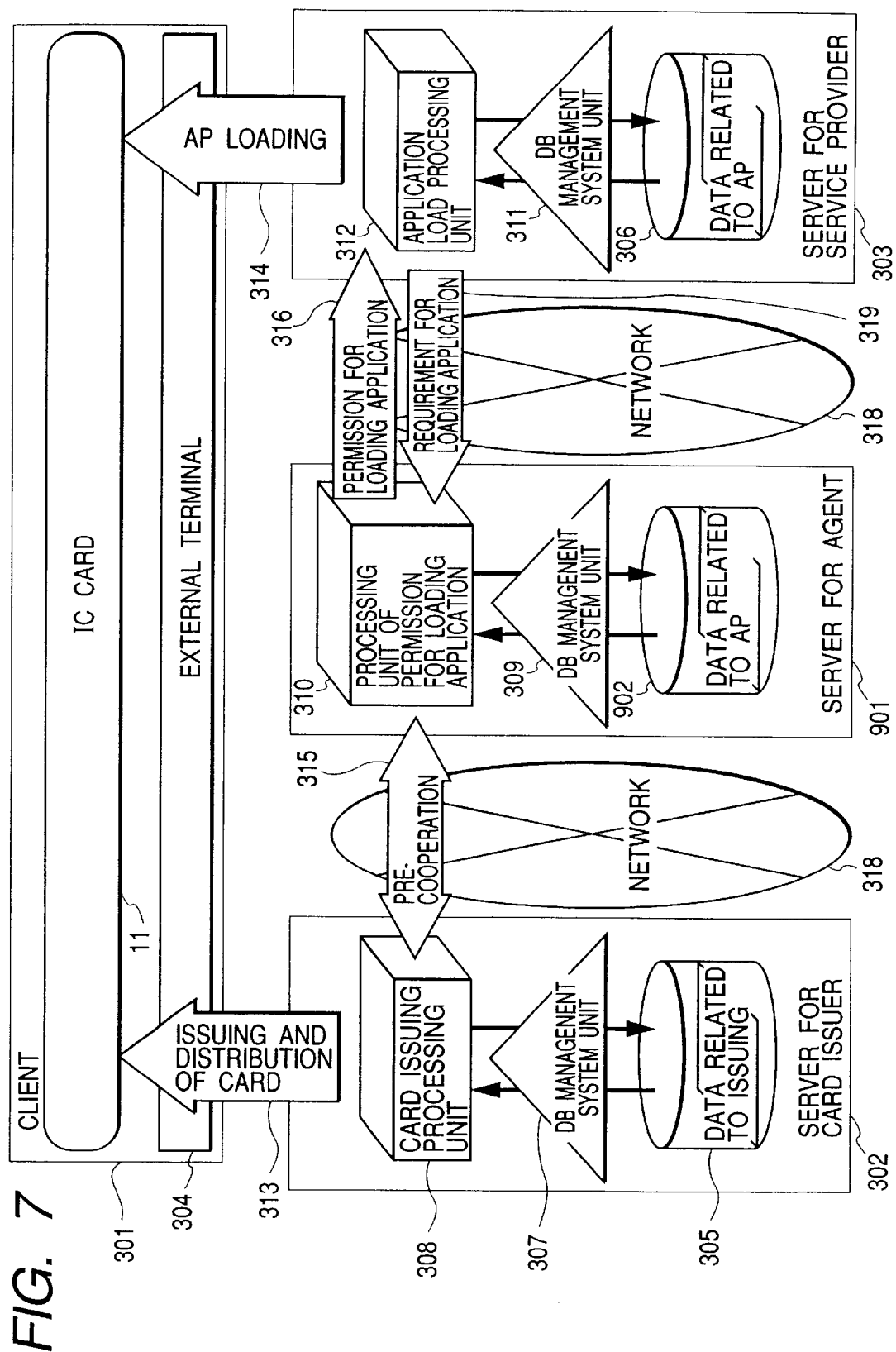

IC CARD SYSTEM AND IC CARD

BACKGROUND OF THE INVENTION

1. Field of the Invention

The present invention relates to technologies of dynamic authentication by a third party other than a party issuing an IC card(that is, smart card), a method to load an application onto an IC card as well as utilization of the dynamic authentication and the method.

2. Related Arts

Since an IC card can be used for recording a large amount of information and offers a high degree of security, the IC card is becoming popular in recent years as an information-recording medium serving as a substitute for a magnetic card. Also becoming the main topic of IC cards in recent years are an IC card provided with a multi-application function capable of loading a plurality of applications on the IC card, an IC card having a dynamic loading function capable of loading an application after the issuing of the IC card and a card OS.

Traditionally, a system for loading an application onto any of these IC cards limits applications to be loaded only to applications that have a signature of an institution issuing the cards. This is because a system allowing anybody to load an application raises a security problem and, in addition, the so-called dynamic loading function for loading an application into an IC card after the issuing of the card is a premise.

FIG. 1 is a diagram showing the logical configuration of basic areas inside an IC mounted on an IC card 11. As shown in the figure, the IC comprises a hardware layer 101, an area for loading an OS and an area for loading applications. To be more specific, the area for loading an OS is an OS layer 102 and the area for loading applications is an application layer 107. The multi-application function is a capability of loading a plurality of applications 106 into the application layer 107. The dynamic loading function is a capability of loading or deleting an application 106 after the issuing of the IC card 11. The OS layer 102 includes a communication processing module 103, an interpreter 104 and a security function 105. The OS layer 102 receives a command from an external terminal and transmits a command issued by an application. Of course, an application interface is provided between the application layer 107 and the OS layer 102 whereas a hardware interface is provided between the OS layer 102 and the hardware layer 101.

FIG. 2 is a diagram showing the conventional system configuration for issuing IC cards and rendering services. A card issuer 302 is a business institution mainly doing businesses of issuing IC cards and management of the IC cards. The card issuer 302 is thus responsible for the issuing and management of IC cards. A service provider 303 is a business institution mainly producing applications to be loaded on IC cards and management of the IC cards. In many cases, an application is dynamically loaded onto an IC card from a terminal of the service provider 302 after the issuing of the IC card. A client 301 has an external terminal 304 for exchanging commands between an IC card and the external terminal 304. The card issuer 302 has a card-issuer data base 305 for storing issuing management data. IC-cards are issued and distributed to users in accordance with the issuing management data. The issuing management data includes applications made by users and basic information required for issuance of IC cards. An IC-card loading application created or acquired by the service provider 303 is used for loading an application into an IC card. A service-provider data base 306 is used for storing data related to applications. Such data is referred to hereafter as application relevant data. As described above, the card issuer 302 is responsible for all matters of an IC card. For this reason, there is required a procedure to be followed by the card issuer 302 for recognizing validity of an application. The service provider 303 requests an application load processing unit 310 employed in the card issuer 302 to permit an operation to load an application. In the card-issuer data base 305, application data has been stored in advance. The application load processing unit 310 checks the requested application to form a judgment as to whether or not the application is invalid. The application load processing unit 310 also checks the service provider 303 making the request to from a judgment as to whether or not the service provider 303 is illegal. If the application is valid and the service provider 303 is legal, the application load processing unit 310 issues permission for loading the application. The service provider 303 then transmits the application and the permission for loading the application to the IC card. For this reason, the service provider 303 makes a contract with the card issuer 302 in advance to assure that the service provider 303 is a legal business enterprise and applications to be loaded are not invalid.

It is assumed that the server of the card issuer 302 and the server employed in the service provider 303 are connected to each other by a network in many cases and the severs are capable of exchanging documents with each other.

In addition, in an operation to load an application into an IC card, the card may use an application and data dedicated to application loading. In such a system, each service provider 303 is provided with an application known as a security domain for executing functions of application loading, deletion and management.

FIG. 3 is a diagram showing the logical configuration of basic areas inside an IC loaded into an IC card 11 having a security domain unit. A security domain 108 existing at an application layer is used for managing applications 106 for which the IC card 11 is responsible. An application 106 is loaded or deleted in a process through the security domain 108. In addition, the security domain 108 is entrusted with management of security information such as key data and management of data such as ID numbers in some cases.

The conventional system for loading an application onto an IC card described above is capable of dynamically loading and deleting an application while maintaining a high degree, of security. In an operation among a plurality of card issuers and their service providers, however, there are raised some problems.

As described above, a service provider needs to make a contract in advance with a card issuer issuing an IC card, on which the service provider desires to load an application. That is to say, the card issuer is in relationships based on contracts with all service providers, which each desire to load an application onto an IC card issued by the card issuer. When the card issuer loads or deletes an application onto or from an IC card at a request made by a service provider, the application loading technique described above can be adopted. To be more specific, a service provider 803 in a relationship based on a contract with a card issuer 302 is capable of loading an application onto an IC card 11 by adopting the conventional method as shown in FIG. 5. However, a request to load an application may be made by a service provider 803, which did not make a complicated contract in advance with the card issuer 302 or does not request the card issuer 302 to catalog the application severally. In the first place, the fact that a plurality of applications can be loaded into an IC card is a great advantage and the fact that a plurality of services can be rendered is a big merit to the card issuer 302, which manages the IC cards, and the user using the cards. Thus, a demand for the capability of handling such a request made by the service provider 803 and the capability of storing a plurality of applications as well as the capability of rendering a plurality of service is expected to rise year after year. With the contemporary application loading technique, it is impossible to render a service without making a contract in advance. As shown in FIG. 5, some information needs to be exchanged between the service provider 803 and the card issuer 302. That is to say, in accordance with the conventional application loading system, a service provider needs to make a contract in advance with each card issuer issuing an IC card, on which the service provider desires to load an application thereof. In addition, the service provider must obtain permission for loading an application from a card issuer when the application is loaded onto an IC card issued by the card issuer. The following problems rise in the implementation of the conventional application loading system.

(1) Relations based on contracts and communication traffics during operations between card issuers and service providers increase in number and become complicated.

In operations to mutually render services between N card issuers and M service providers, N*M relationships based on contracts are established, resulting in a large number of contracts and a lot of communication traffic during operations. Thus, the cost and the processing time increase and, as a result, the price of the IC card eventually rises.

(2) In actuality, enterprises are not capable of establishing relationships based on contracts.

Assume a case, in which an application produced by a domestic enterprise is loaded onto an international IC card. In this case, making a direct contract between the domestic enterprise and the international card issuer is not so practical. The international card issuer may conceivably establish a representative for handling businesses with domestic enterprises. However, it is difficult for the international card issuer to make a direct contract and establish a communication with a business institution, to which the service provider pertains.

SUMMARY OF THE INVENTION

The present invention has the following 2 main aspects. The basic concepts and the main points of the aspects can be summarized briefly as follows.

In accordance with a first main aspect of the present invention, an authentication issued by a third party other then the issuer of an IC card is used. An authentication issued by a third party other then the issuer of an IC card is referred to simply as an agent authentication.

In accordance with a second main aspect of the present invention, an IC card has a security domain with a restricting function. The second aspect serves as a supplement to the first aspect to allow a more useful IC card system to be provided.

In addition, in accordance with a third main aspect of the present invention, a combination of the concepts according to the first and second main aspects is used. In this way, an agent recognized by a card issuer is capable of serving as an agent to load an application into an IC card issued by the card issuer under a condition set forth by the card issuer.

The following description explains the present invention by focusing on the basic concepts of the present invention mentioned above.

First of all, the first aspect of the present invention is explained.

A first mode of the present invention is in that an IC-card system comprising:

a second organization, a third organization, and an on-line system between said second organization, said third organization, wherein:

a second organization is capable of supplying at least first characteristic information characterizing a first organization involved in an issuance of an IC card as well as serving as data used for rendering a service and second special information of said second organization to a third organization involved in presentation of service information; and said third organization involved in presentation of service information is capable of supplying at least a program of a desired application, said first characteristic information characterizing said first organization involved in an issuance of an IC card as well as serving as data used for rendering a service and said second special information of said second organization to said IC card.

In the first place, more than anything else, the basic concept according to the first aspect is provided for solving the aforementioned problem that the number of relationships based on contracts and the amount of traffic during operations increase.

In order to implement the basic concept according to the present aspect, the concept of introduction of an agent between a card issuer and a service provider is embraced. It becomes necessary to establish a system capable of loading an application without the need for the service provider to establish a direct communication with the card issuer. To put it concretely, by authentication of an agent business through pre-cooperation between the card issuer and the agent, the service provider is capable of loading an application without directly communicating with the card issuer. In addition, a system capable of maintaining security at the same level as the ordinary application loading system is required.

The present invention provides an application loading system that is used for loading an application onto an IC card and satisfies the requirements described above.

FIG. 6 is an explanatory diagram showing main elements of a system provided the present invention. In the system shown in the figure, an IC card 11 is issued by a card issuer 302. An A service provider 303 has made a contract with the card issuer 302 and issues an application 801 to the IC card 11 by adoption of the ordinary application loading technique. On the other hand, a B service provider 803 has made a contract with an agent 901.

A premise adopted by the present invention is that no communication is established between the service provider 803 and the card issuer 302 in order to solve the problems described above. Thus, the present invention provides a technique of establishing indirect communication through an agent. That is to say, in accordance with this technique, the agent is entrusted with a job of permitting an operation to load an application used to be done by the card issuer and, in order to load an application onto an IC card, the service provider needs to communicate only with the agent. With a technique whereby only an agent needs to put a signature to an application, however, there are raised the following problems. In the first place, the validity of an IC card cannot be verified. In the second place, an unauthorized user is capable of loading an application without regard to the will of the card issuer. By the way, a signature put by an agent to an application is referred to hereafter as a message signature by an agent. It is needless to say that "the signature" means a signature in the technical field of coding theory. The typical example is a digital signature. The general theory about such a signature and a digital signature can be taught by for example, "CRYPTOGRAPHY: Theory and Practic" written by Dagrus Stynson and translated by Kouichi Sakurai, Chapter 6, especially page 217 to page 220 and "Handbook of Applied Crystalgraphy" (CRC Press, 1996) page 433 to page 434.

An outline of a first embodiment or the present invention for solving the problems is explained as follows. In the first place, when a contract of cooperation is made between a card issuer and an agent, the card issuer hands over an agent certification in advance to the agent. The agent certification certifies the agent work done by the agent. In the second place, when the agent authenticates an application, the agent hands over a message signature by an agent and the agent certification to the service provider. In this way, in accordance with the present invention, the agent certification verifies the validity of an IC card issued by the card issuer, preventing an unauthorized user from loading an application.

A second embodiment of the present invention mainly supplements functions of the first embodiment, allowing a more useful IC-card system to be provided. In brief, an IC card has a security domain with the so-called restricting function.

A second mode of the present invention is in that an IC-card system comprising:

a second organization, a third organization, and an on-line system between said second organization, said third organization, wherein:

a second organization is capable of supplying at least first characteristic information characterizing a first organization involved in an issuance of an IC card as well as serving as data used for rendering a service, second special information of said second organization and a program having a condition on loading service information into said IC card to a third organization involved in presentation of service information; and said third organization involved in presentation of service information is capable of supplying at least an application program, said first characteristic information, said second special information of said second organization, said program having a condition on loading service information into said IC card to said IC card and third characteristic information related to said program having a condition on loading service information into said IC card to the IC card.

With only the first embodiment of the present invention, once an agent certification is issued, the agent is provided with a power enabling the agent to load an unlimited number of applications. Even though operations are carried out in accordance with conditions stated in a cooperation contract, it is needless to say that the card issuer may desire to provide a power enabling the agent to load only 1 application or a power enabling the agent to load applications within a set term of power validity. The second embodiment of the present invention is provided for satisfying such desires.

As described earlier, the security domain is an area having data or an application for implementing functions such as loading, deletion and management of applications in the IC card. Thus, naturally, a security domain is created by a service provider. In the present invention, however, a card issuer creates a security domain and hands over the security domain to a service provider through an agent to let the service provider function as a security domain. When creating a security domain, the card issuer sets conditions of a cooperation contract in the security domain such as the number of times to load applications and a term of validity, and transmits the security domain to the partner of cooperation. Of course, it is necessary to embrace a substitution preventing policy for the security domain.

As shown in FIG. 6, a security domain 805 having a restricting function is created by a card issuer 302 and stored in an IC card 11 as a security domain of a service provider 803. When the service provider 803 loads an application 802, the service provider 803 requests an agent 901 to grant permission for loading the application 802. Receiving the request for such permission, the agent 901 transmits a combination of an agent certification and a message signature by the agent 901 to the inside of an A IC card 11. The A IC card 11 verifies that the agent certification has been issued by the card issuer 302 correctly by referring to restricting conditions set in the security domain with a restricting function. If the message signature by the agent 901 confirms the validity of the application 802 as a result of the verification of the agent certification, the A IC card 11 permits an operation to load the application 802.

BRIEF DESCRIPTION OF THE DRAWINGS

FIG. 5 is an explanatory diagram used for describing problems encountered in the conventional technique;

FIG. 6 is a diagram showing relations among an IC card, a card issuer and a service provider in the present invention;

FIG. 7 is a diagram showing the basic configuration of a system provided by the present invention;

DETAILED DESCRIPTION OF THE PREFERRED EMBODIMENT

Figure 1:
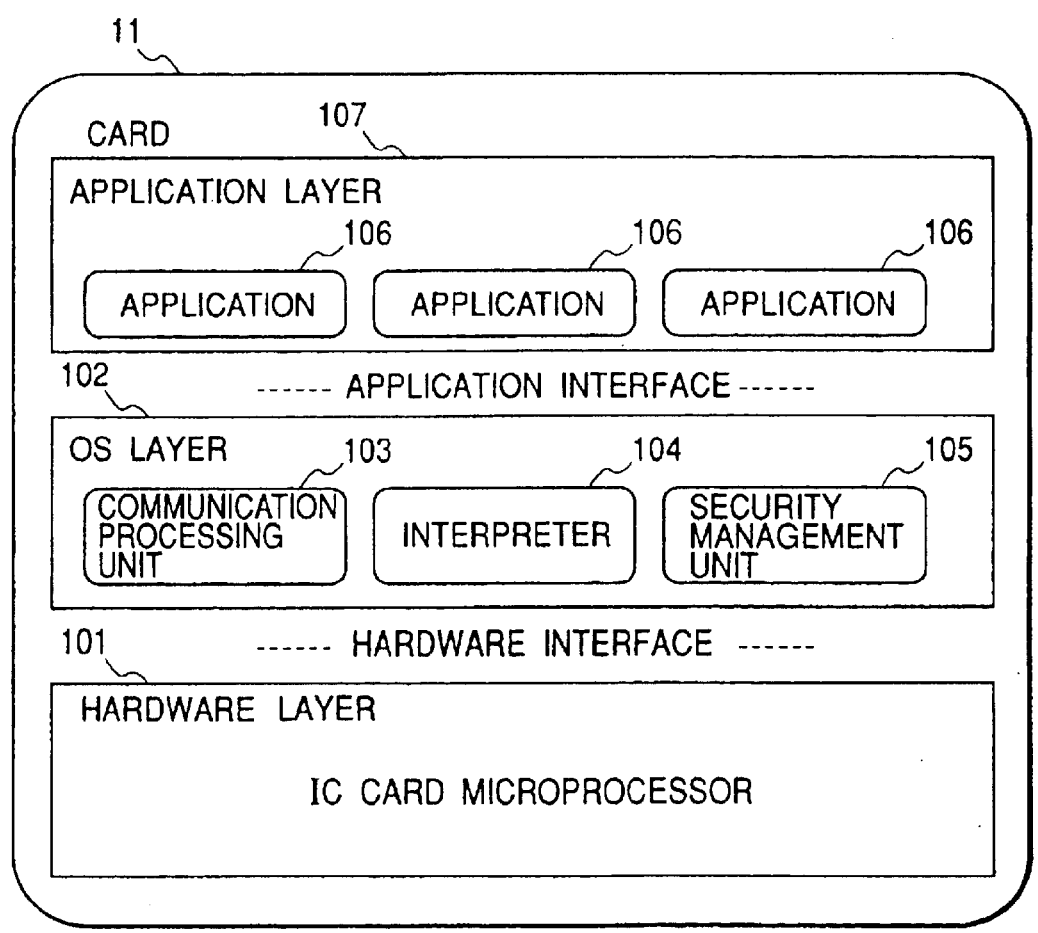
FIG. 1 is a diagram showing the basic configuration of an IC card.
Figure 2:
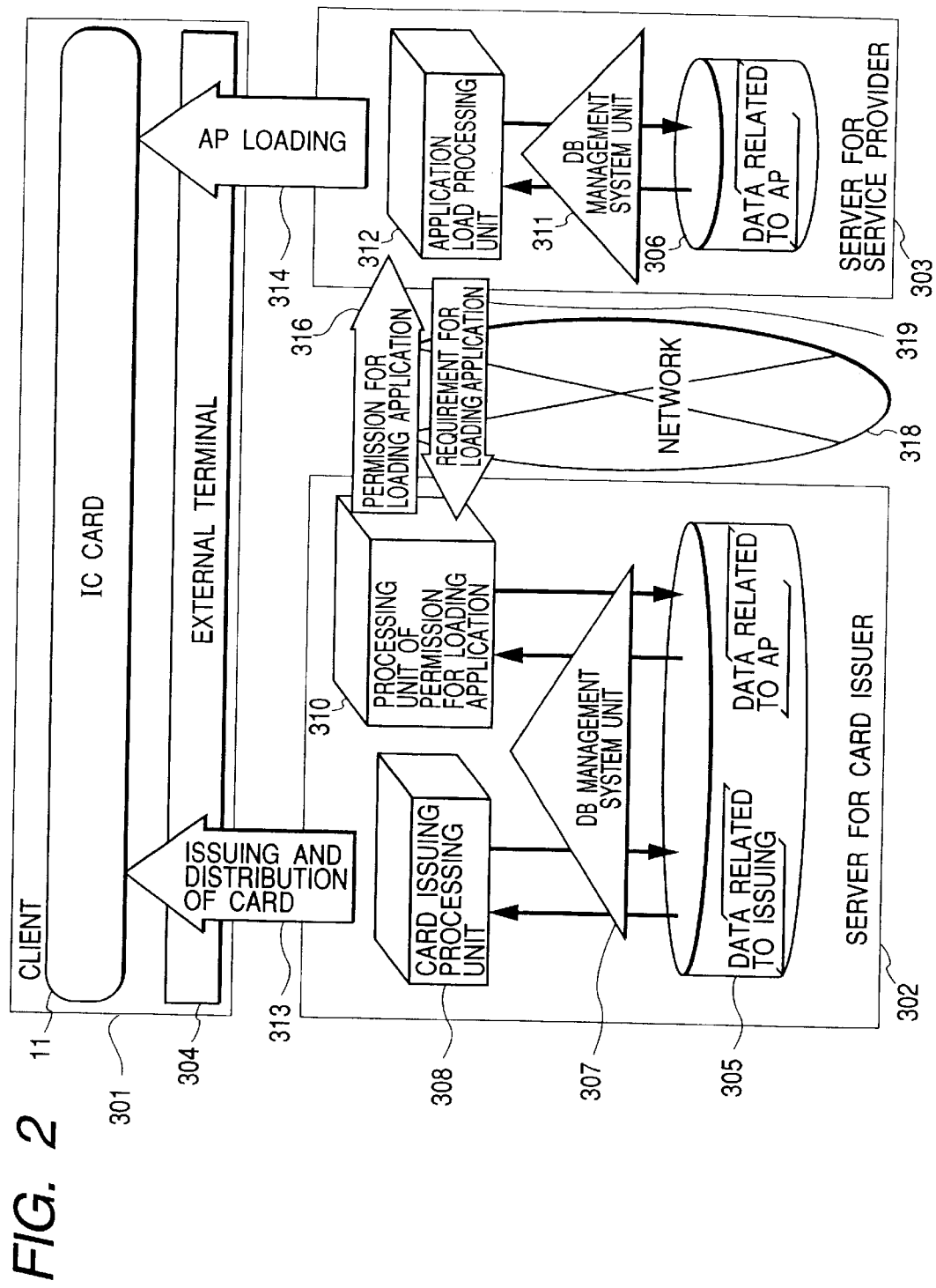
FIG. 2 is a diagram showing a typical system configuration used so far for issuing IC cards and rendering services.
Figure 3:
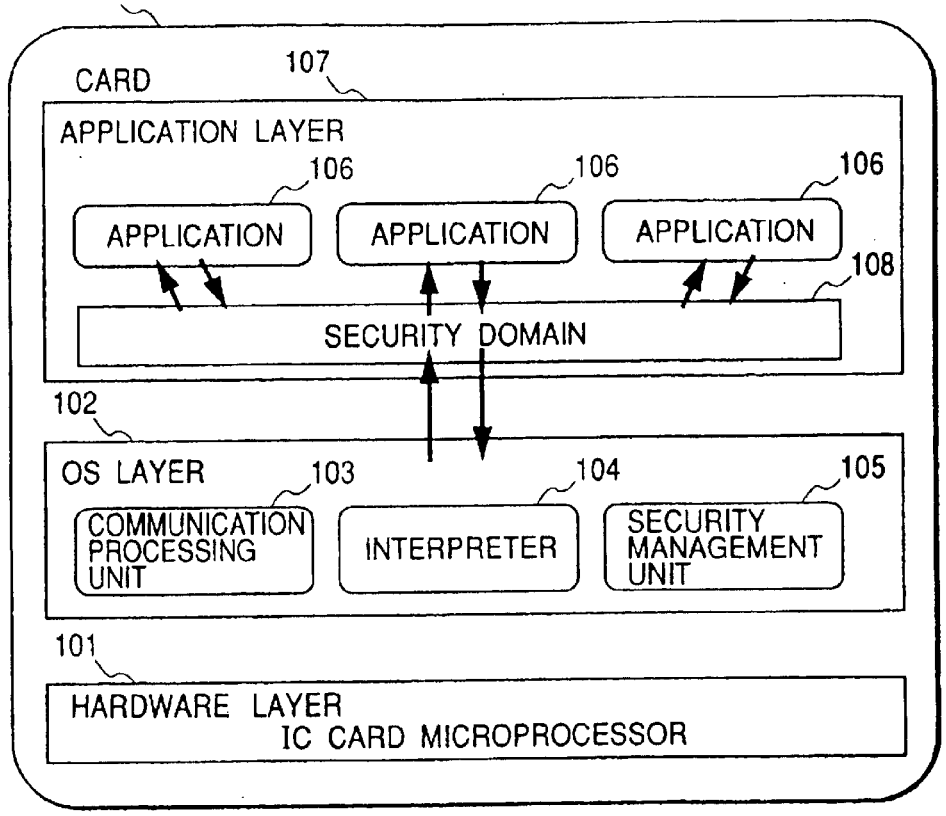
FIG. 3 is a diagram showing the basic configuration of an IC card having a security-domain unit.
Figure 4:
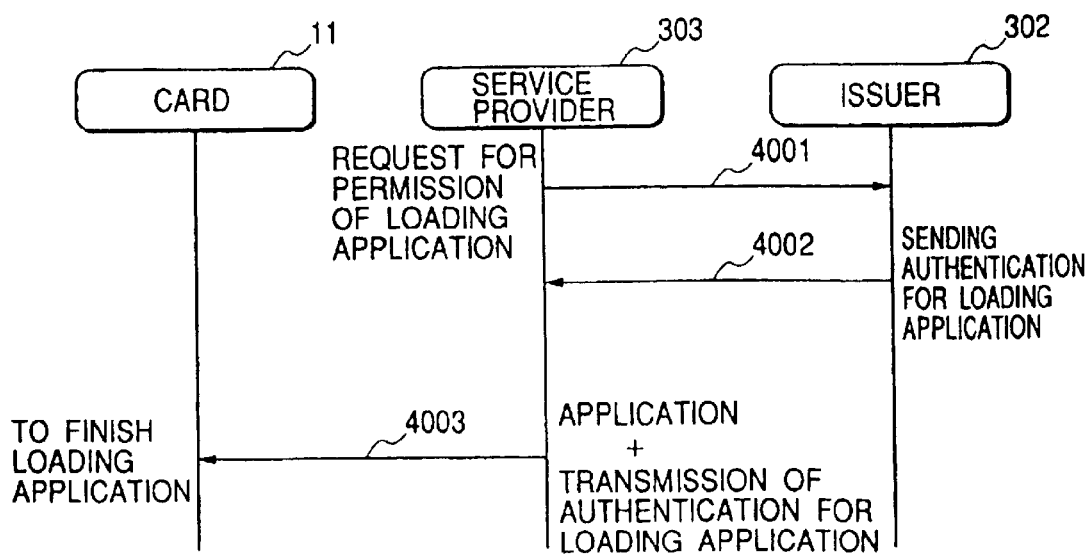
FIG. 4 is a diagram showing a typical conventional sequence for loading an application.

FIG. 7 is a diagram showing the basic configuration of a system for issuing IC cards 11 provided by the present invention and applications of the IC cards 11. In the figure, reference numeral 302 denotes a server of a card issuer and reference numeral 305 denotes a data base of the card issuer. The data base 305 is used for managing issuing management data, which is operating information, that is, information on all IC cards operated by the card issuer. Reference numerals 901 and 902 denote a server of an agent and a data base of the agent respectively. The data base 902 is used for managing application related data, which is operation management information, that is, information on applications with loading operations thereof permitted by the agent. Reference numeral 303 and 306 denote a server of a service provider and a data base of the service provider respectively. The data base 306 is used for managing application related data, which is operation information, that is, information on applications of the service provider itself. An IC card 11 is issued by a card-issuing processing unit 308 in the card-issuer system and distributed to users 301, which each serve as a client. Here, the "issue" and the "distribution" of an IC card are the issue and the distribution in ordinary everyday language and not on-line operation.

The card-issuing processing unit 308 makes a pre-cooperation contract 315 with an application-load permission processing unit 310 of the agent system and issues an agent certification indicating a certified agent to the agent. When the service-provider sever 303 loads an application onto the IC card 11, an application-load processing unit 312 in the service-provider system makes a request 319, requesting the application load processing unit 310 of the agent system to load the application. The agent verifies the validity of the application in accordance with an operating policy and issues permission for loading an application 316 if validity of the application is confirmed. The service provider transmits a combination 314 of the permission for loading the application 316 received from the agent and the application 316 to the IC card 11 by way of an external terminal 304. The card-issuer server 302 and the agent server 901 are connected to each other by a network 318. On the other hand, the agent server 901 and the service-provider server 303 are connected to each other by a network 319. In accordance with a policy embraced by the operating business enterprise, however, information may be mailed by using information recording medium such as a floppy disc or by using a written letter. As described above, in the system provided by the present invention, a card issuer makes a cooperation contract with an agent, which issues service rendering permission to a service provider on behalf of the card issuer, and the service-provider server loads an application onto an IC card of a user.

Here, main characteristic terms in this specification to be easy to understand the following description.

"Message signature by agent" designates signing for standing in the place of a card issuer. The typical example is an information that an information to be signed is added an information which is the above-said information to be signed encrypted by an agent's secret key to.

"  having signature" designates an information that " " is added an information which encrypted by a key of the signer, for example, a signer's secret key to.

"Agent certification" designates an information which certificates by a card issuer that an agent is a person standing in the place of the card issuer. The typical example is an information that an agent's public key is added an information which is the agent's public key encrypted by an issuer's secret key to.

"Authentication certificate" designates an information for allowing or permitting to load an application to an IC card (that is, a smart card). The typical example is an information that a characteristic information by which an application is characterized is added the characteristic information encrypted by agent's secret key to.

"Security domain" designates a programming for loading, deleting an application and managing the application and some other items.

"Security domain having restricting function" designates a programming having one or some restricting functions for loading, deleting an application and managing the application and some other items.

The present invention relates to a data system having an asymmetrical encryption function. The asymmetrical encryption function designates, for example, that in the data system, a secret key and a public key are used, and an encrypted data can be decrypted by such an asymmetrical encryption key.

Next, concrete methods of message signature by agent and loading of an application related to the present invention are explained.

Here, a conventional terminal apparatus for an IC card can be applied for the present invention. Each facility of the present invention has a terminal including a server and a read and writer for IC card, etc. Some modes of operating can be employed for this system. For example, one is in case of that some kinds of information are once stored in the server, and the other are in case of that some kinds of information are loaded to IC card by a server and a read and writer for IC card, and is in case of that some kinds of information are loaded directly to IC card a read and writer for IC card. In the present invention, of course, all mode can be employed.

In FIG. 29, a diagram depicting briefly the concept of a card system. As shown in the figure, IC card 52 includes an IC chip 51 and exchanges data with typically a reader and writer 53 which has a control processor 54 and a magnetic disc 55 serving as a data base. The layout of pins shown in the figure is a typical pin layout. That is to say, the IC card has a Vcc (power supply) pin, GDN(ground) pin, an RST (reset) pin, an I/O(input/output) pin and a CLK(clock).

For example, the operation to issue an inquiry about an ID is denoted by reference numeral (1) in FIG. 29. The operation to transmit the name code is denoted by reference numeral (2) in FIG. 29. It should be noted that an ordinary card system capable of sufficiently providing necessary functions can be employed. The detailed description on this system is omitted.

Here, the above-said application and security domain etc. are once stored in a memory region of IC card, that is, more concretely IC chip.

The memory region is implemented typically by using such as a ROM(read Only Memory), a RAM(Random Access Memory), an EEPROM(Electrical Erasable Programmable Read Only Memory), Flash memory and FRAM (Ferromagnetic Random Access Memory). In this specification, the phrases, for example, "using a security domain" "through a security domain" or "over a security domain" designate the followings: that is, OS reads the security domain, that is, a programming for loading, deleting an application and managing the application and some other items, and validity of some controlling or managing situations of the predetermined information or data are verified by using the security domain, that is, the programming. And if necessary, a necessary and predetermined processing is done. Here, the above-said conditions for information or data are, for example, capacity for storing service information, the number of times of loading applications or information, the number of loading service information, or the effective term for permitting loading a service information, etc.

An ordinary OS region is, of course, employed in the present invention.

Moreover, a contact type IC card and non-contact type IC card are employed in the present invention.

Figure 8:
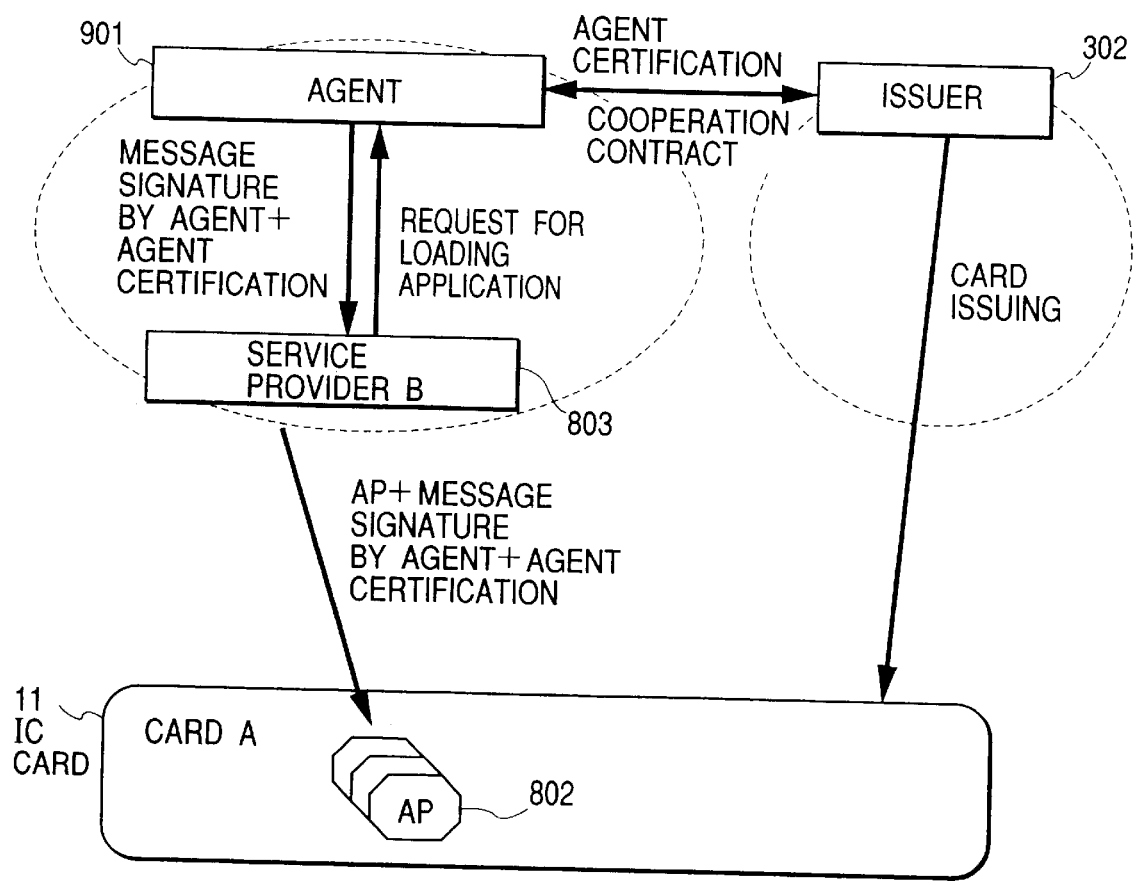
FIG. 8 is a diagram showing relations among an IC card, a card issuer and a service provider for implementing a message signature by an agent.

Next, a message signature by an agent is explained by referring to FIG. 8. An A IC card 11 is an IC card loaded with an OS for dynamic loading of a plurality of applications. The A IC card 11 has already been issued by a card issuer 302. A B service provider 803 is a business enterprise rendering a service of loading an application onto the A IC card 11. The service provider 803 makes a contract of rendering services with an agent 901. In a normal case, in order for the B service provider 803 to load an application onto the A IC card 11, the B service provider 803 communicates with the card issuer 302 to get permission for loading an application from the card issuer 302 in accordance with a contract of rendering services made with the card issuer 302. However, the system provided by the present invention adopts a method whereby the card issuer 302 makes a cooperation contract with an agent 901, and the agent 901 serves as a proxy of the card issuer 302, issuing permission for loading an application. At a time the cooperation contract is made, the card issuer 302 hands over an agent certification to the agent 901. The agent certification recognizes proxy businesses to be conducted by the agent 901 on behalf of the card issuer 302. In an operation to load an application onto the A IC card 11, the B service provider 803 receives permission for loading the application from the agent 901 before loading the application.

The following description explains how to realize the system implemented by the first embodiment of the present invention as described above in concrete terms by referring to FIG. 9. That is to say, the following description explains a processing sequence followed by an agent to put a message signature.

Representative Basic Processing Sequence of Putting a Signature by an Agent

A card issuer 302 has made a cooperation contract based on a mutually cooperative policy with an agent 901. Upon an agreement on the cooperation contract, the agent 901 transfers an asymmetrical key & a public key of its own to the card issuer 302 to make a request for an agent certification at a step 12001.

The card issuer 302 transmits an agent certification to the agent 901 at a step 12002. A signature is put to the agent certification by using an asymmetrical key and a secret key owned by the card issuer 302 for the public key received from the agent 901.

Then, in an operation carried out by a B service provider 803 to load an application onto an A IC card 11, first of all, the B service provider 803 requests permission for loading the application onto the A IC card 11 from the agent 901 at a step 12003. An example of the request for permission for loading an application is a hash value of the application to be loaded. The hash value of an application is an intrinsic value peculiar to the application. It should be noted, however, that the request for permission for loading an application does not have to be a hash value. Nevertheless, a hash value is most convenient and thus widely used.

The agent 901 checks the contents of the application, which was filed for permission by the B service provider 803 in advance, in order to verify the validity of the application. If a hash value cited above is used, the validity is verified by comparing the hash value received from the B service provider 803 with a hash value generated internally in the A IC card 11 for the application. Details of this verification will be described later. If information on the A IC card 11 is received from the card issuer 302, the information is also verified as well. An example of the information on the A IC card 11 is a hot list or a black list revealing information on illegal cards.

The agent 901 puts a signature to the hash value of the application received from the B service provider 803 by using an asymmetrical key and a secret key and returns the signed hash value to the B service provider 803 along with the agent certification at a step 12004. It should be noted that the secret key corresponds to an asymmetrical key & a public key, which were transmitted to the card issuer 302 when the cooperation contract was made.

The B service provider 803 transmits a combination of the hash value of the application received from the agent 901, the agent certification and the application itself to the A IC card 11 at a step 12005. As described earlier, the hash value is a hash value with a message signature put thereto by the agent 901.

The A IC card 11 includes a public key of the card issuer 302, which was stored therein when the card 11 was issued. The public key is used for authenticating the signature of the agent certification in order to confirm its validity. This is because the signature was put thereto by using the public key of the agent 901. If a correct signature is confirmed, the public key is used to decrypt the hash value of the application. A hash value obtained as a result of the decryption is compared with a hash value computed from the application received from the B service provider 803. If they match each other, the application is loaded and installed. The operation to load the application is completed upon the installation of the application.

As described above, the procedure implemented by the first embodiment of the present invention provides a mechanism wherein the agent assures the validity of an application and the card issuer assures the validity of the agent so that an application assured indirectly by the card issuer can be loaded onto an IC card. As is obvious from the example shown in FIG. 6, between the card issuer and the other players, there is a step of transmitting an agent certification following a cooperation contract. After this step, however, the card issuer enters an offline state, making it unnecessary to establish communication with other players. Depending on the contents of a cooperation contract, however, card issuers may exchange hot lists each revealing information on illegal IC cards and information required in a variety of operations. Even in this case, it is not necessary for a card issuer to establish communication with a service provider.

More operation details of the processing based on the basic processing sequence for putting a message signature of an agent described above are explained by referring to FIGS. 10 to 14. These figures show flowcharts representing operations carried out by the players, namely, the IC card, the card issuer, the agent and the service provider.

Figure 10:
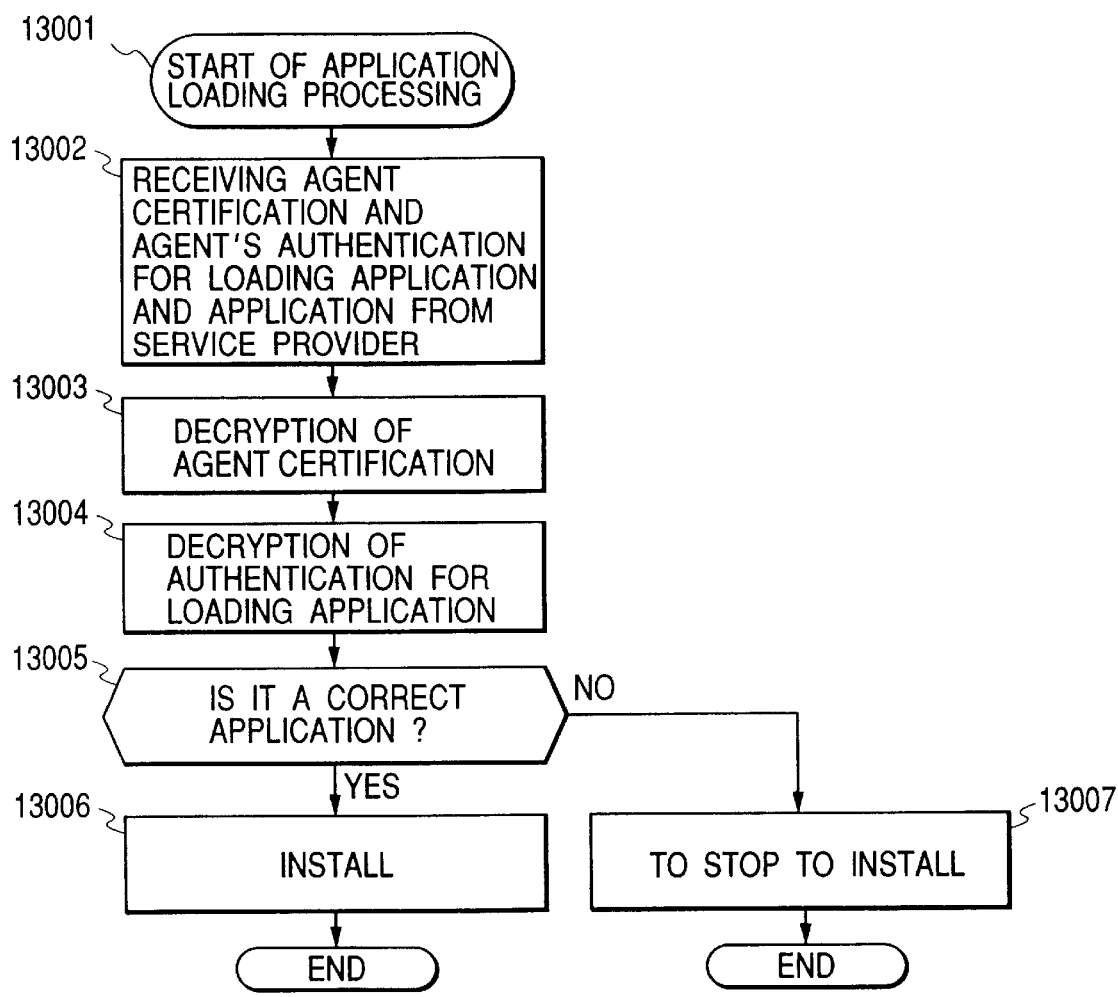
FIG. 10 is a diagram showing a sequence provided by the present invention for loading an application onto an IC card.

IC Card: Typical Processing Performed by an IC Card to Load an Application onto the IC Card FIG. 10 shows a flowchart representing operations carried out on the IC-card side to load an application using a message signature of an agent onto the IC card.

As shown in the figure, the flowchart begins with a step 13001, at which the IC card starts processing to load an application.

At the next step 13002, the IC card receives an agent certification and an application authentication from a service provider. The application authentication was signed by an agent. The step 13002 corresponds to the step 12005 of the sequence shown in FIG. 9.

The agent certification has been signed by a card issuer. By the way, a key corresponding to the agent certification is stored in the IC card. The IC card uses the key for authenticating the agent certification and decrypting a key of the agent at a step 13003.

The decrypted key of the agent is used for authenticating the application authentication signed by the agent and fetches a hash value of the application at a step 13004.

At the next step 13005, the IC card also internally computes a hash value of the application received from the service provider and compares with a hash value decrypted earlier at the step 13004.

If the hash values match each other, the flow of the processing goes on to a step 13006 at which the IC card recognizes the application authenticated by the card issuer as a valid application and install the application.

If the hash values do not match each other, on the other hand, the flow of the processing goes on to a step 13007 at which the application is determined to be invalid. Thus, the processing to install the application is canceled and the IC card outputs an error message.

Figure 11:
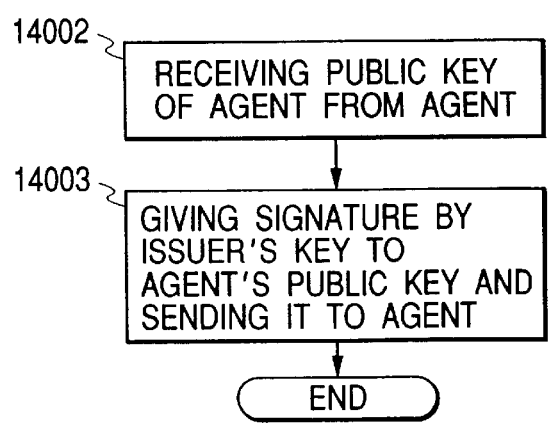
FIG. 11 is a diagram showing a sequence provided by the present invention to be followed by a card issuer for implementing pre-cooperation.

Card Issuer: Typical Processing Performed by a Card Issuer to Perform Pre-cooperation Using an Agent Signature FIG. 11 shows a flowchart representing operations carried out by a card issuer to perform pre-cooperation using a message signature put thereto by an agent. These operations correspond to the steps 12001 and 12002 of the sequence shown in FIG. 9.

As shown in FIG. 11, the flowchart begins with a step 14001, at which the card issuer starts pre-cooperation processing to recognize an agent.

The card issuer receives a public key from the agent at a step 14002. The public key is used for creating an agent certification.

The card issuer puts a signature to the disclosed key by using a key corresponding to a key stored in an IC card and transmits the signed disclosed key to the agent at a step 14003.

The processing described above is the pre-cooperation between the card issuer and the agent.

Figure 12:
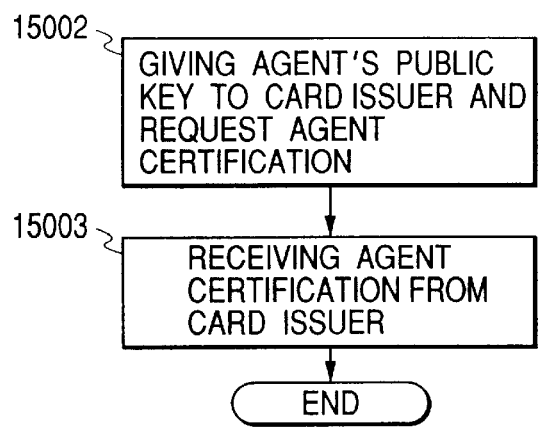
FIG. 12 is a diagram showing a sequence provided by the present invention to be followed by a service provider for implementing pre-cooperation.

FIG. 12 shows a flowchart representing the agent's pre-cooperation processing procedure using a message signature of the agent. As shown in the figure, the flowchart begins with a step 15001, at which the agent starts pre-cooperation processing to execute jobs of a proxy of a card issuer. First of all, the agent transmits its public key to the card issuer at a step 15002. At the next step 15003, the agent receives an agent certification signed by the card issuer.

Agent: Typical Processing to Load an Application by Using an Agent Signature

Figure 13:
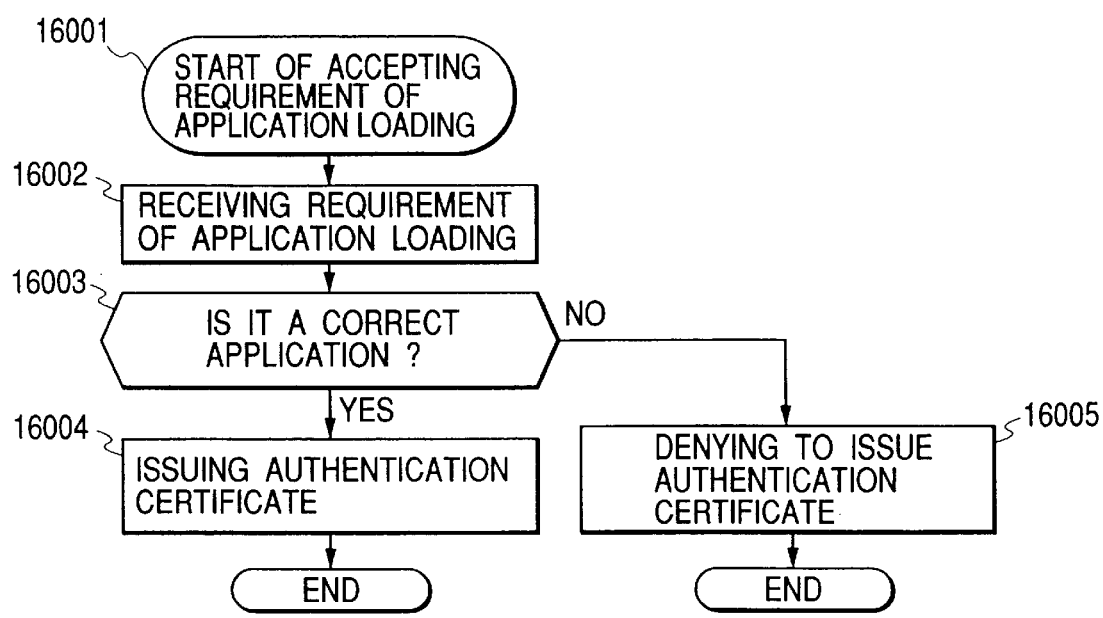
FIG. 13 is a diagram showing a sequence provided by the present invention to be followed by an agent for loading an application onto an IC card.

FIG. 13 shows a flowchart representing the procedure of processing to load an application using a message signature put by an agent.

At a step 16002, the agent receives a request to load an application from a service provider. At the next step 16003, the agent verifies the validity of the contents of the application cataloged in advance and the validity of the service provider in order to form a judgment as to whether or not to permit an operation to load the application.

If the operation to load the application is permitted, the flow of the processing goes on to a step 16004, at which the agent transmits an application authentication to the service provider. The application authentication is a combination of data representing characteristics of the application and the agent certification received from a card issuer in a pre-cooperation process. The data, which was received from the service provider, has been encrypted by the agent using a key. An example of the data representing characteristics of the application is the aforementioned hash value of the application.

If the operation to load the application is not permitted, on the other hand, the flow of the processing goes on to a step 16005, at which the agent notifies the service provider of the fact that the loading operation is not allowed.

Figure 14:
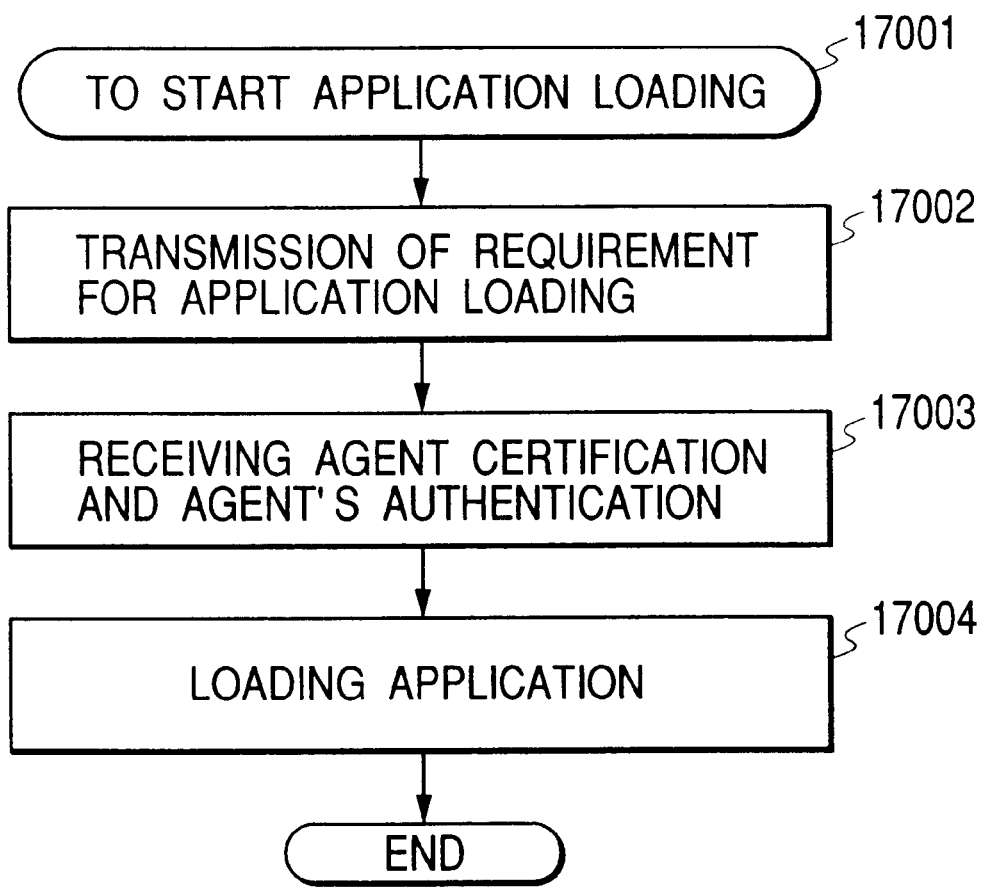
FIG. 14 is a diagram showing a sequence provided by the present invention to be followed by a service provider for loading an application onto an IC card.

Service Provider: Typical Processing to Load an Application of the Service Provider FIG. 14 shows a flowchart representing the procedure of processing to load an application of a service provider by using a message signature put by an agent.

At a step 17002, the service provider transmits data representing characteristics of an application to the agent to make a request for permission for loading an application. An example of the data is a hash value of the application.

At the next step 17003, the service provider receives an application authentication from the agent. The service provider then transmits the application authentication to an IC card along with the application itself at a step 17004.

The pieces of processing described above are typical processing procedures to load an application onto an IC card by using the agent-signature method.

Next, examples of a second embodiment providing functions supplementary to the first embodiment of the present invention described so far are explained. As described previously, briefly speaking, an IC card provided by the second embodiment has a security domain with the so-called restricting function.

As described above, by handing over an agent certification to an agent, the problems can be solved, but another problem is raised. That is to say, once an agent certification is handed over to an agent, the agent is usually provided with a power capable of loading an unlimited number of applications thereafter. However, an application loading area on an IC card is not limitless. In addition, a cooperation contract is normally made as a contract, which is good only for a predetermined term of validity. Thus, there is desired a mechanism wherein the card issuer may provide a power enabling the agent to load only 1 application or a power enabling the agent to load applications only within a set term of power validity.

Figure 15:
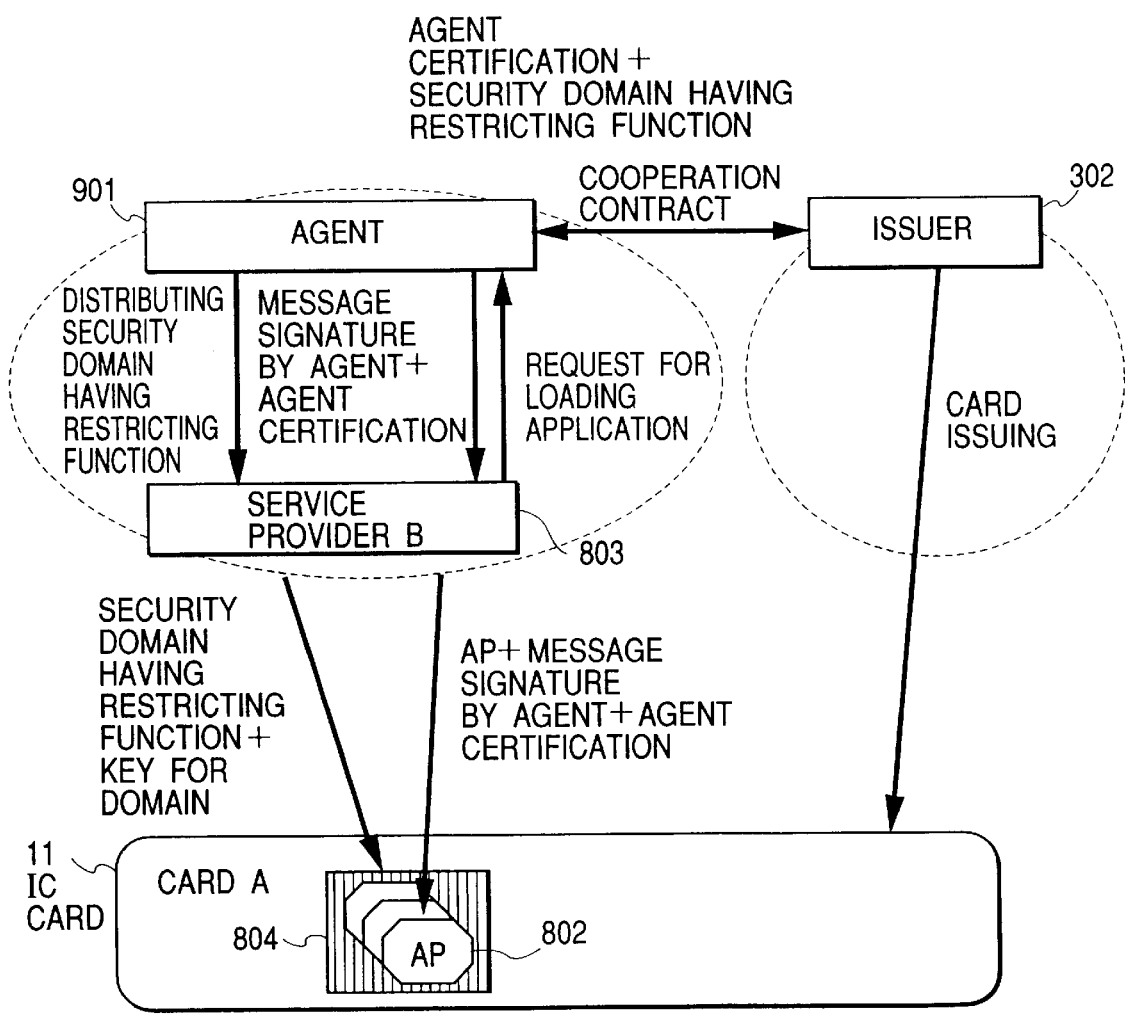
FIG. 15 is a diagram showing the basic configuration of an IC card having a security domain.

The second embodiment of the present invention is provided for satisfying such a mechanism. FIG. 15 is a diagram showing a complete configuration using a security domain with a restricting function.

Figure 9:
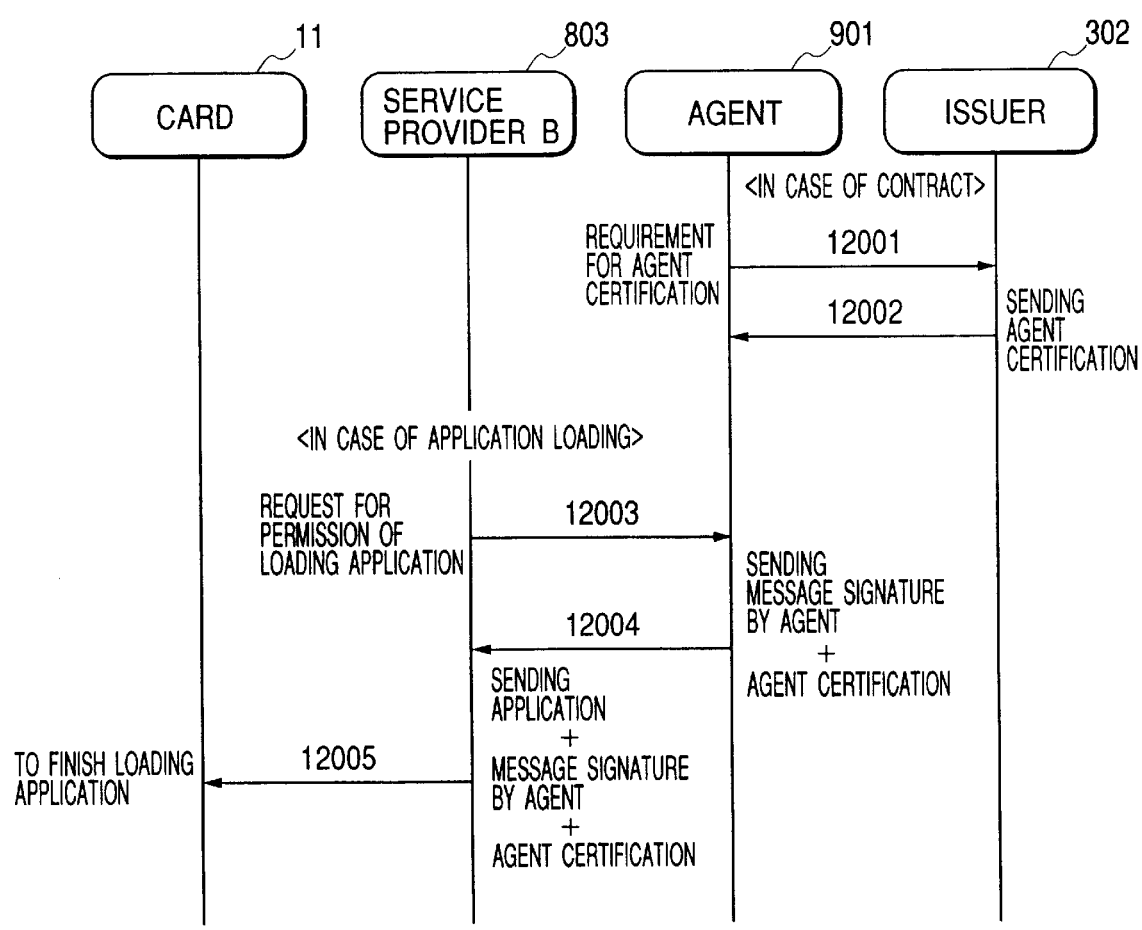
FIG. 9 is a diagram showing a sequence for implementing cooperation based on a message signature by an agent.

The roles and relations of players shown in FIG. 15, namely, the IC card 11, the card issuer 302, the agent 901 and the service provider 803, are the same as those shown in FIG. 11. To be more specific, the card issuer 302 makes a cooperation contract with the agent 901, and the agent 901 serves as a proxy for the card issuer 302 to issue permission for loading an application on behalf of the card issuer 302 as is the case with the system shown in FIG. 11. However, the system shown in FIG. 15 is different from the system shown in FIG. 11 in that, in the case of the former, it is necessary to load a security domain into the IC card 11 before loading an application onto the same IC card 11. In the following description, only differences from the sequence shown in FIG. 9 are mainly explained and the explanation of things common to both the systems is omitted.

A security domain executes loading, deletion or management of applications on an IC card. Preconditions for enabling such management are:
1: An asymmetrical key and an encryption key can be stored in the security domain.
2: An application is stored into an IC card through the security domain.

Actual implementations of a security domain include an application, a library and data. Traditionally, a security domain is created by a business enterprise loading an application. In accordance with the present invention, however, a security domain is created by a card issuer. When a cooperation contract is made, the card issuer 302 hands over an agent certification and a security domain with a restricting function to the agent 901. As described earlier, the agent certification is an evidence issued by the card issuer 302 for recognizing the agent 901. First of all, a B service provider desiring to load an application onto an A IC card must load a security domain with a restricting function onto the A IC card. The B service provider receives the security domain from the agent 901 and sets the security domain in the A IC card. Then, the B service provider receives permission for loading the application from the agent 901 and loads the application onto the A IC card through the security domain.

Figure 16:
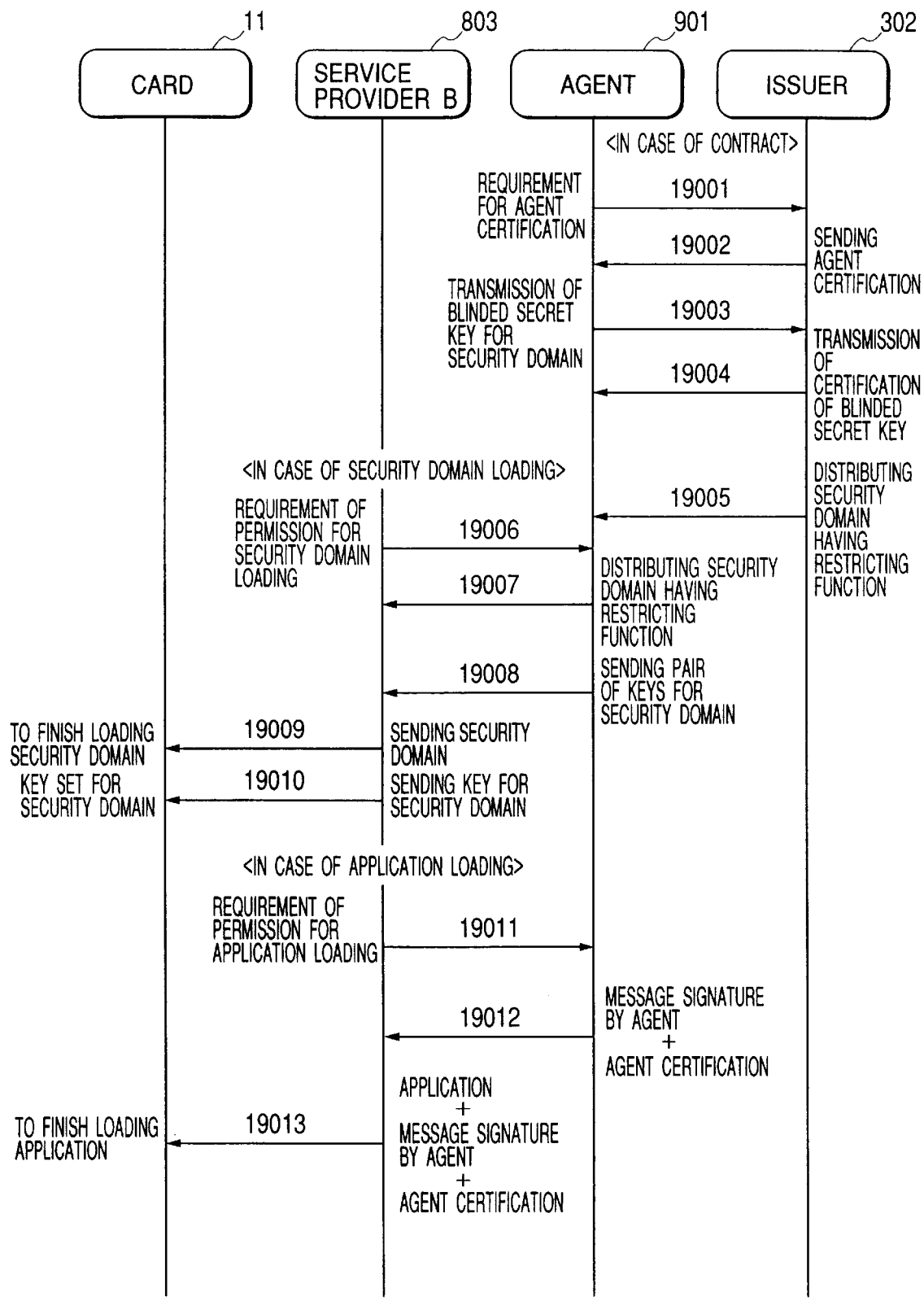
FIG. 16 is a diagram showing a sequence provided by the present invention for implementing cooperation using a message signature by an agent and a security domain.

FIG. 16 is a diagram showing a processing sequence to implement cooperation by using a combination of functions of a message signature of an agent and a security domain.

The card issuer 302 makes a cooperation contract based on a mutual operating policy with the agent 901. If the card issuer 302 agrees with the agent 901 on the cooperation contract, the agent 901 transmits an asymmetrical key and a public key of its own to the card issuer 302 in order to request an agent certification from the card issuer 302 at a step 19001.

For the public key received from the agent 901, the card issuer 302 puts an asymmetrical key and a secret key of its own to an agent certification and transmits the agent certification to the agent 901 at a step 19002.

Then, keys to be stored in the security domain are exchanged between the agent 901 and the card issuer 302. During an operation, a key of the card issuer 302 and a key of the agent 901 are stored in the security domain. First of all, the agent 901 creates a pair of asymmetrical keys for the security domain and transmits the secret key to the card issuer 302 at a step 19003.

If the data of the secret key is known by other parties including the card issuer 302, however, a security problem is raised. Thus, the secret key is subjected to a blinding process prior to the transmission. By the same token, the card issuer 302 creates a pair of asymmetrical keys for the security domain. The secret key is used for putting a signature to the secret key, which was subjected to the blinding process in the agent 901, and returns the signed secret key back to the agent at a step 19004.

The agent 901 removes the blind from the signed secret key received from the card issuer 302. A blind-signature method for an asymmetrical key is an already known technology. An example of the blind-signature method is an RSA blind-signature technique described in documents such as a reference with a title of "Handbook of Applied Cryptography" authored by A. Menezes and P. van Oorschot and published by CRC Press in 1996.

Then, the card issuer 302 creates a security domain, setting a restricting condition according to the cooperation contract in the security domain. Then, the card issuer 302 then stores a security-domain public key of its own in the security domain. As an alternative, the card issuer 302 sets the security-domain public key in a security domain created in advance in accordance with the cooperation contract. Then, the card issuer 302 puts a signature to the security domain by using a secret key of the card issuer 302 and sends the signed security domain to the agent 901 as a security domain having a restricting function at a step 19005. Exchanges of information for the pre-cooperation contract are finished at this step.

A point attracting attention in this case is the fact that a security-domain key of the card issuer and a security-domain key of the agent exist in addition to the asymmetrical keys, namely, the key of the card issuer and the key of the agent.

Next, exchanges of information in an operation to load an application into an IC card are explained. Since a security domain set in the IC card is a premise of the operation to load an application into the IC card, a method of loading the security domain into the IC card is described first.

Typical Method of Loading a Security Domain

A security domain of a B service provider 803 loaded into an IC card 11 is a security domain with a restricting function. The security domain with a restricting function is transmitted by a card issuer 302 to an agent 901 as part of pre-cooperation. At a step 19006, the agent 901 receives a request for permission for loading a security domain from the B service provider 803.

At the next step 19007, the agent 901 transmits the security domain with a restricting function to the B service provider 803. It should be noted, however, that security domains may have been distributed to service providers 803 in advance. That is to say, the operation carried out at the step 19007 to transmit a security domain may precede the operation carried out at the step 19006 to receive the request for permission for loading the security domain. At the next step 19008, the agent 901 transmits a pair of security-domain keys to the B service provider 803. The pair of keys consists of a signed secret key received by the agent at the step 19004 and a public key corresponding to the signed secret key. As described earlier, the blind was removed from the signed secret key.

The security-domain public key was not encrypted and has no signature put thereto. The B service provider 803 uses this security-domain public key for purposes such as verifying a signature in a communication with the security domain and holding a secured communication. At the next step 19009, the B service provider 803 stores the security domain having a restricting function into the IC card 11. The IC card 11 verifies the validity of the security domain as follows. As described earlier, a signature of a key of the card issuer 302 was put to the security domain at the step 19005. A public key of the card issuer 302 was loaded onto the IC card 11 when the IC card 11 was issued by the card issuer 302. Thus, the IC card 11 is capable of verifying the validity of the security domain by using these keys.

If the validity can be verified, the IC card 11 receives a security-domain secret key from the B service provider 803 at a step 19010 and verifies the validity of this key. As is obvious from the description of the step 19004, the security-domain key is a security-domain key of the agent 901, to which a signature is put by using a security-domain secret key of the card issuer 302. In the security domain with a restricting function set on the IC card 11, a security-domain public key of the card issuer 302 is set. Thus, the validity of the signature can be verified internally. If the validity of the security-domain key can be verified, the key is decrypted and the security-domain secret key of the agent 901 is set in the security domain having a restricting function.

Up to this point, the security domain having a restricting function was stored into the IC card 11 and the key was also set. Thus, the security domain can starts execution of its functions. In the security domain, the following keys are stored:

(a) a public key created by the card issuer 302 for the security domain
(b) a secret key created by the agent 901 for the security domain A secret key associated with the public key (a) is kept by the card issuer 302. On the other hand, a public key associated with the secret key (b) has been transmitted to the B service provider 803. That is to say, the security domain created by the card issuer 302 with a restricting function has keys of the two players, and functions in the IC card 11.

Next, an operation carried out by the B service provider 803 to load an application into the A IC card 11 is explained.

First of all, at a step 190011, the B service provider 803 issues a request for permission for loading an application into the A IC card 11 to the agent 901. In actuality, the request for such permission is to transmit a hash value of the application to be loaded.

The agent 901 verifies the validity of the application by referring to the contents of the application filed in advanced by the B service provider 803. If information on IC cards such as a hot list, that is, a black list of invalid IC cards, was also received from the card issuer 302, the black list is also checked to determine whether or not the A IC card 11 is on the list. The agent 901 then puts its signature to the hash value of the application received from the B service provider 803 by using its own secret key and transmits the signed hash value to the B service provider 803 at a step 19012 along with agent certification received at the step 19002. It should be noted that the secret key corresponds to the asymmetrical public key, which was transmitted to the card issuer 302 when the cooperation contract was made.

The B service provider 803 encrypts the application by using the security-domain public key received at the step 19008 and then transmits the encrypted application to the A IC card 11 at a step 19013 along with the hash value of the application with the message signature of the agent 901 put thereto and the agent certification. The hash value and the agent certification were received at the step 19012 as a response to the request for permission for loading the application.

After the security domain with a restricting function in the A IC card 11 receives the information, first of all, the security domain verifies the signature of the agent certification. The agent certification is a public key of the agent 901 with a signature put thereto by using a security-domain secret key of the card issuer 302. Since a public key associated with the security-domain secret key is held in the security domain having a restrictive function, the public key can be used for verifying and decrypting the signature. Since a key used for putting a signature of the agent 901 to the hash value of the application is a secret key of the agent 901, the hash value is decrypted by using the decrypted public key of the agent 901. On the other hand, the application was encrypted by using a security-domain public key of the agent 901. Since a secret key corresponding to the security-domain public key is stored in the security domain with a restricting function, the secret key can be used for decrypting the application and fetching the hash value. This fetched hash value is compared with the hash value obtained earlier as a result of the decryption. If they match each other, the application is determined to be valid. The valid application is then loaded and installed in the A IC card 11 at a step 19013. At this step, the operation to load the application is finished.

The procedure described above provides a mechanism wherein the agent 901 assures the validity of an application and the card issuer 302 assures the validity of the agent 901 so that an application assured indirectly by the card issuer 302 can be loaded onto an IC card 11. As described above, in the security domain, the following keys are stored:
(a) a public key created by the card issuer 302
(b) a secret key created by the agent 901.

The public key (a) is used for verifying the agent certification while the secret key (b) is used verifying the application.

Differences from a mechanism using only a message signature of an agent are described as follows:

(1) In the first place, keys for verifying validity in an IC card are stored in a security domain.
(2) In the second place, the above keys are created by a card issuer and an agent in advance for security-domain use.
(3) In the third place, the above keys are used for loading, deletion and management of applications by a security domain or a card OS using security-domain information.

As described above, loading, deletion and management of applications are controlled by a security domain with a restricting function provided by the present invention. Since the security domain is created by a card issuer in accordance with conditions prescribed in a cooperation contract, an operation to load an unlimited number of applications can be avoided. In accordance with the present invention, the following policy can be adopted in case an agent puts its signature illegally. To put it in detail, a cooperation contract may prescribe proper conditions such as:
1: Only 1 application can be loaded.
2: A date is set as a loading deadline.
3: An upper limit of the amount of loaded information is set.

In this way, a security domain with a restricting function can be created. Communications between the card issuer and other players are put in an offline state after the cooperation contract is made. An application may be transmitted to an IC card against the will of the card player. In such a case, however, an operation to load the application into the IC card will be blocked by the security domain on the IC card.

More detailed typical operations based on the basic processing sequence using the security domain described so far are explained by referring to FIGS. 17 to 24. The figures show flowcharts representing operations carried out by players, namely, the IC card, the card issuer, the agent and the service provider. In the figures throughout this specification, the security domain with a restricting function provided by the present invention is represented by a hatched box.

IC Card: Typical Processing to Load a Security Domain

Figure 17:
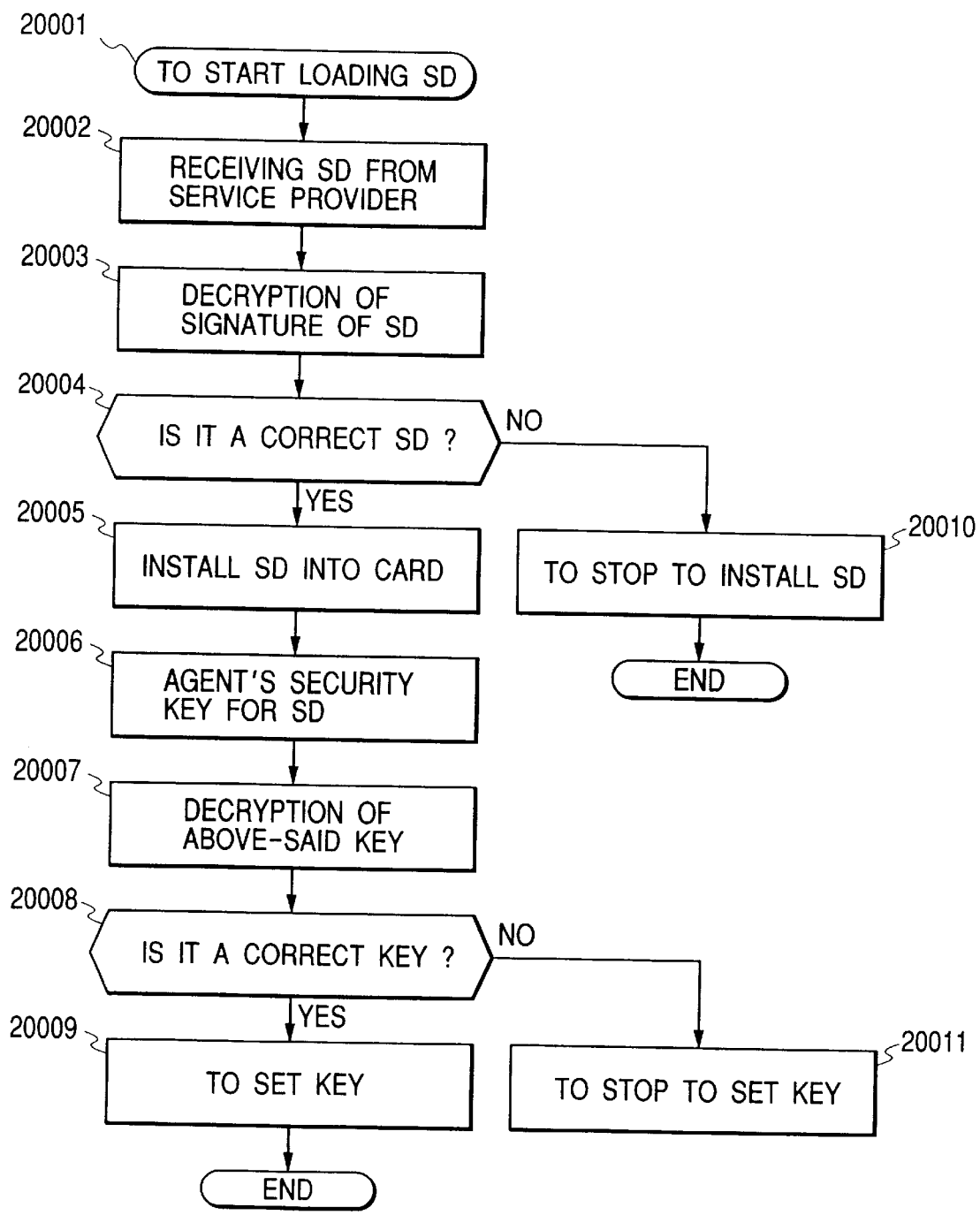
FIG. 17 is a diagram showing a sequence provided by the present invention for loading an SD (security domain) onto an IC card.

FIG. 17 shows a flowchart representing processing carried out by an IC card to load a security domain into the IC card by adopting a method provided by the present invention. This processing corresponds to the steps 19009 and 19010 of the sequence shown in FIG. 16.

At a step 20002, the IC card receives a security domain from a service provider. Since the security domain was signed by using a key of a card issuer, the security domain is decrypted by the IC card at a step 20003 by using a key corresponding to the key used to put a signature to the security domain.

At the next step 20004, the signature put to the security domain is checked. If the signature is found correct, the flow of the processing goes on to a step 20005, at which the security domain is installed in the IC card. If the signature is found incorrect, on the other hand, the flow of the processing goes on to a step 20010, at which the IC card outputs a message indicating-that the installation of the security domain is canceled.

After the security domain is installed at the step 20005, the flow of the processing proceeds to a step 20006 at which a key to be set in the security domain is received. Since the received key is signed by using a security-domain key of the card provider, the received key is decrypted by using a decryption key corresponding to the security-domain key at a step 20007. The decryption key was stored in the security domain when the security domain was created.

At the next step 20008, the received key is verified to determine whether or not the key is correct. If the key is found correct, the flow of the processing goes on to a step 2009, at which the key is set in the security domain. If the key is found incorrect, on the other hand, the flow of the processing continues to a step 20011, at which a message indicating the cancellation of the key on the security domain is output.

IC Card: Typical Processing to Load an Application

Figure 18:
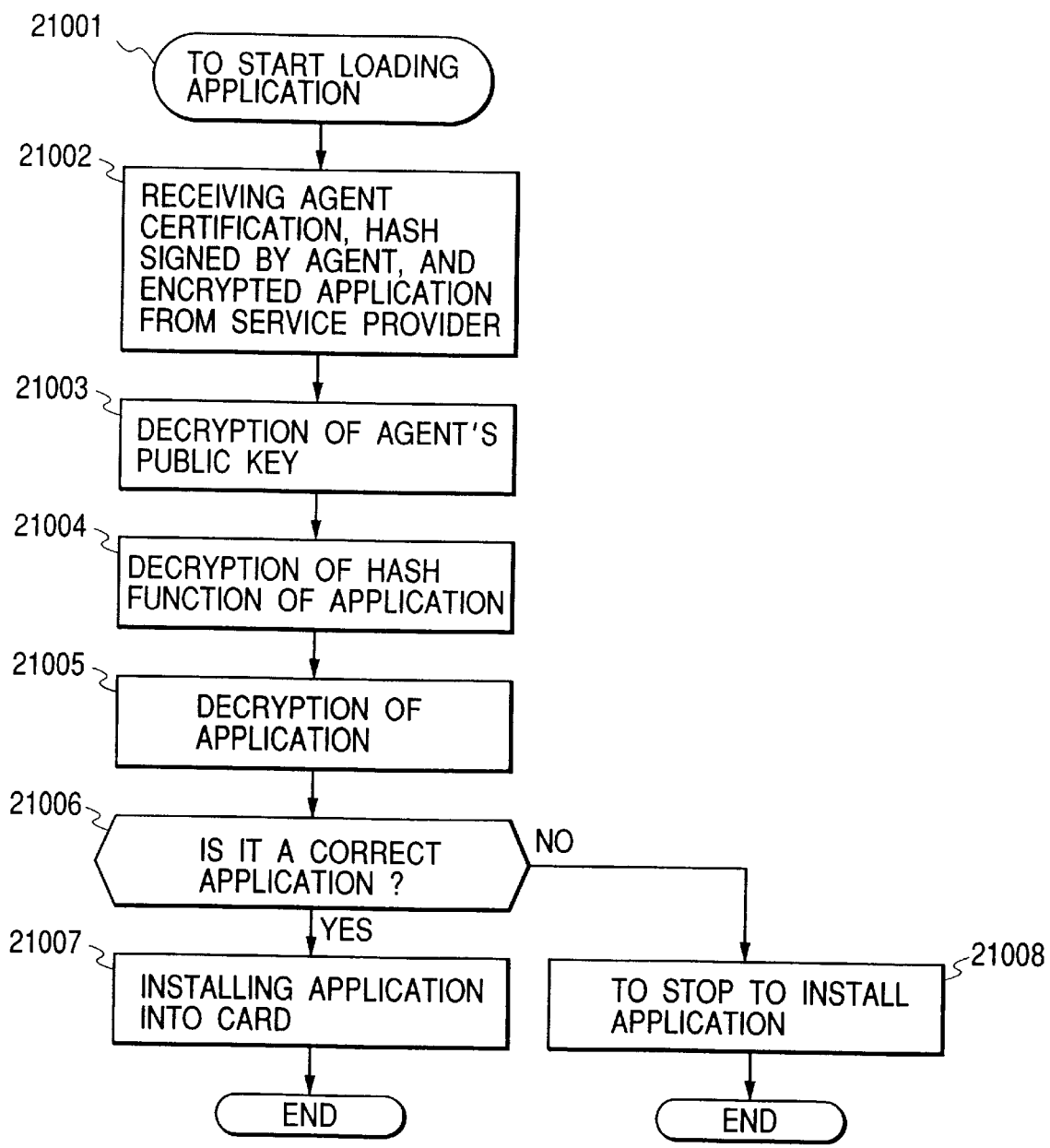
FIG. 18 is a diagram showing a sequence provided by the present invention for loading an application onto an IC card.

FIG. 18 shows a flowchart representing processing carried out by an IC card to load an application into the IC card by adopting a method provided by the present invention. This processing corresponds to the step 19013 of the sequence shown in FIG. 16.

As shown in FIG. 18, the flowchart begins with a step 21001, at which the processing to load an application onto the IC card is started. At the next step 21002, the IC card receives an agent certification, an application authentication and an application from a service provider. The application authentication was signed by an agent and the application was encrypted by using a security-domain key owned by the service provider.

The agent certification was signed by a card issuer by using a key. At the next step 21003, the agent certification is thus authenticated by a key, which is stored in the security domain and corresponds to the key used for signing the agent certification, and the key of the agent is decrypted.

At the next step 21004, the application authentication signed by the agent is authenticated by using the decrypted key of the agent and the hash value of the application is fetched.

The application was encrypted by the service provider by using a key. At the next step 21005, the application is thus decrypted by using a key, which is stored in the security domain and corresponds to the key used for encryption of the application. The application is then fetched and a hash value thereof is calculated by the IC card. At the next step 21006, the calculated hash value is compared with the hash value obtained as a result of the encryption at the step 21004.

If the hash values are equal to each other, the application is recognized as an application authenticated by the card issuer. In this case, the flow of the processing goes on to a step 21007, at which the application is installed in the IC card.

If the hash values are not equal to each other, on the other hand, the IC card determines that it is quite within the bounds of possibility that the application is an illegal application. In this case, the flow of the processing goes on to a step 21008, at which the IC card outputs an error message indicating cancellation of the application installation.

Card Issuer: Typical Pre-Cooperation

Figure 19:
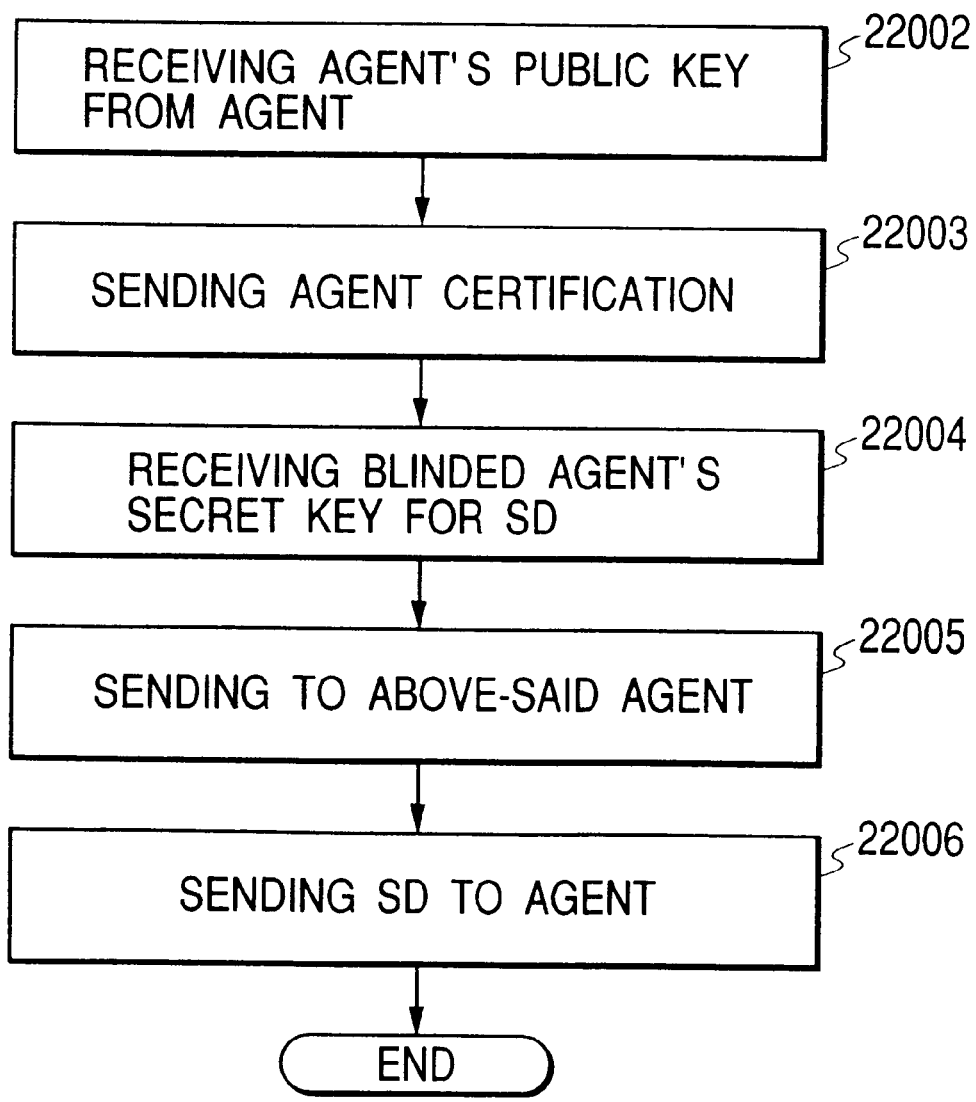
FIG. 19 is a diagram showing a sequence provided by the present invention to be followed by a card issuer for implementing pre-cooperation.

FIG. 19 shows a flowchart representing pre-cooperation processing carried out by a card issuer in accordance with the present invention. This processing corresponds to the steps 19001 to 19005 of the sequence shown in FIG. 16.

As shown in FIG. 19, the flowchart begins with a step 22001 at which pre-cooperation processing to recognize an agent is started. At the next step 22002, the card issuer receives a public key for creating an agent certification from the agent.

At the next step 22003, the card issuer signs the public key by using a key corresponding to a key stored in an IC card and returns the signed public key to the agent.

At the next step 22004, the card issuer receives a key for storing a security domain from the agent. At the next step 22005, the key received from the agent is encrypted by using a key correspond ing to a key set internally in the security domain at a creation time of the security domain and returned to the agent. At the next step 22006, the security domain is signed by using a key of the card issuer and transmitted to the agent.

Agent: Typical Pre-Cooperation

Figure 20:
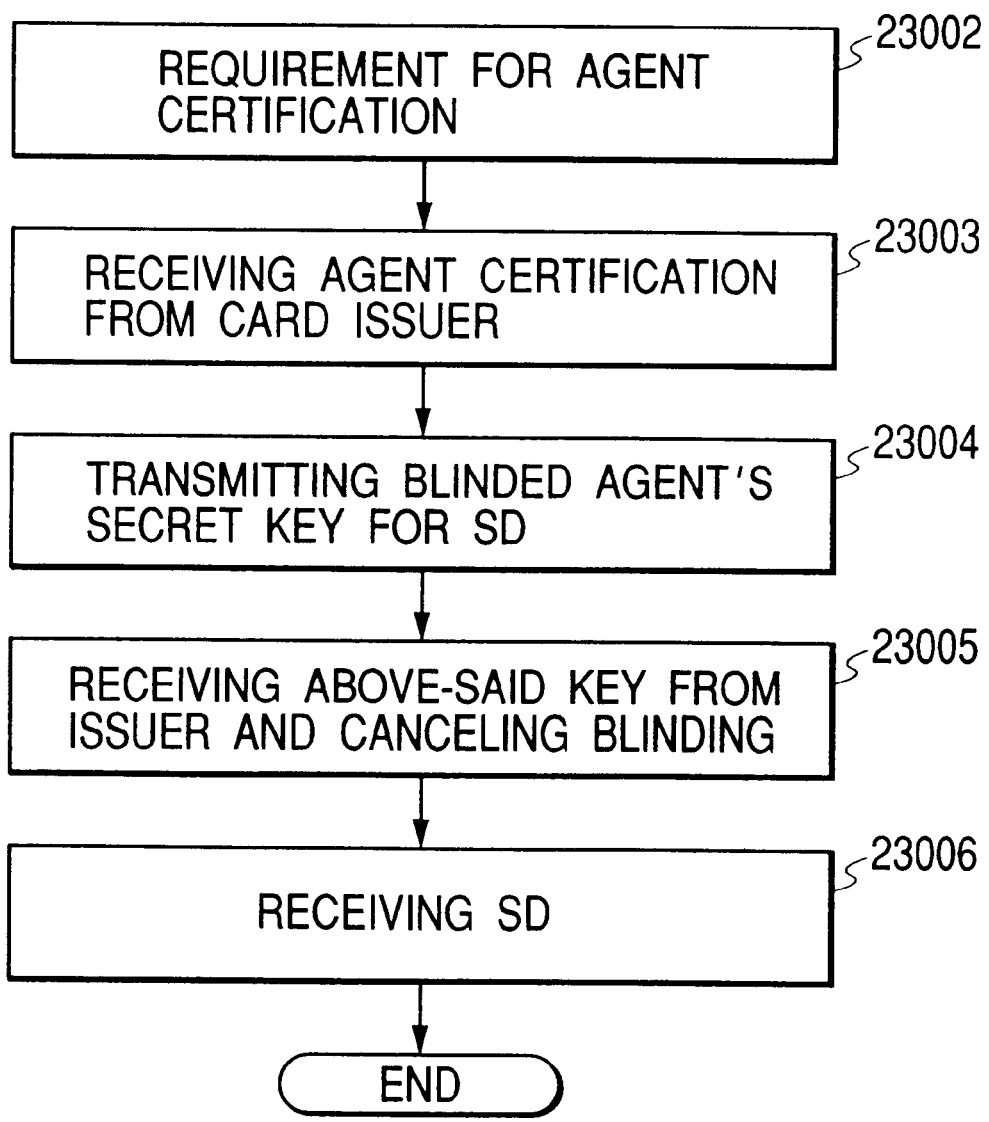
FIG. 20 is a diagram showing a sequence provided by the present invention to be followed by an agent for implementing pre-cooperation.

FIG. 20 shows a flowchart representing the procedure of pre-cooperation processing carried out by an agent in accordance with the present invention.

First of all, at a step 23002, the agent transmits the public key of the agent to the card issuer. At the next step 23003, the agent receives an agent certification, to which the signature of the card issuer was put.

At the next step 23004, the agent generates a secret key for loading a security domain and carries out a blinding process on the secret key before transmitting the secret key to the card issuer.

At the next step 23005, the agent receives the key to which the signature of the card issuer was put and carries out a de-blinding process on the key.

At the next step 23006, the agent receives a security domain including the signature of the agent. This security domain was signed by using a key of the card issuer.

Agent: Typical Processing to Receive a Request to Load a Security Domain

Figure 21:
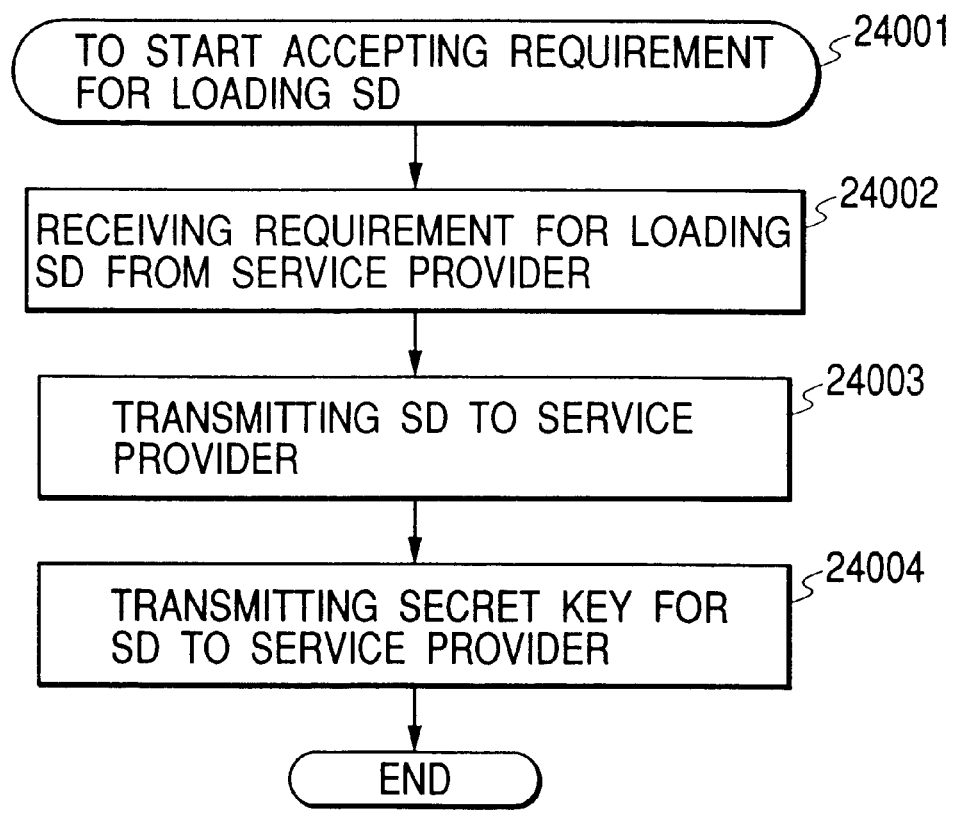
FIG. 21 is a diagram showing a sequence provided by the present invention to be followed by an agent for loading a security domain.

FIG. 21 shows a flowchart representing the procedure of processing carried out by an agent to receive a request to load a security domain into an IC card in accordance with the present invention. This processing corresponds to the steps 19006 to 19008 of the sequence shown in FIG. 16.

At a step 24002, the agent receives a request to load a security domain into an IC card from a service provider. At the next step 24003, the agent transmits a signed security domain received from a card issuer to the service provider as it is.

At the next step 24004, the agent transmits a pair of security-domain keys created in advance to the service provider. The security-domain keys were signed by the card issuer in pre-cooperation processing.

Agent: Typical Processing to Receive a Request to Load an Application

Figure 22:
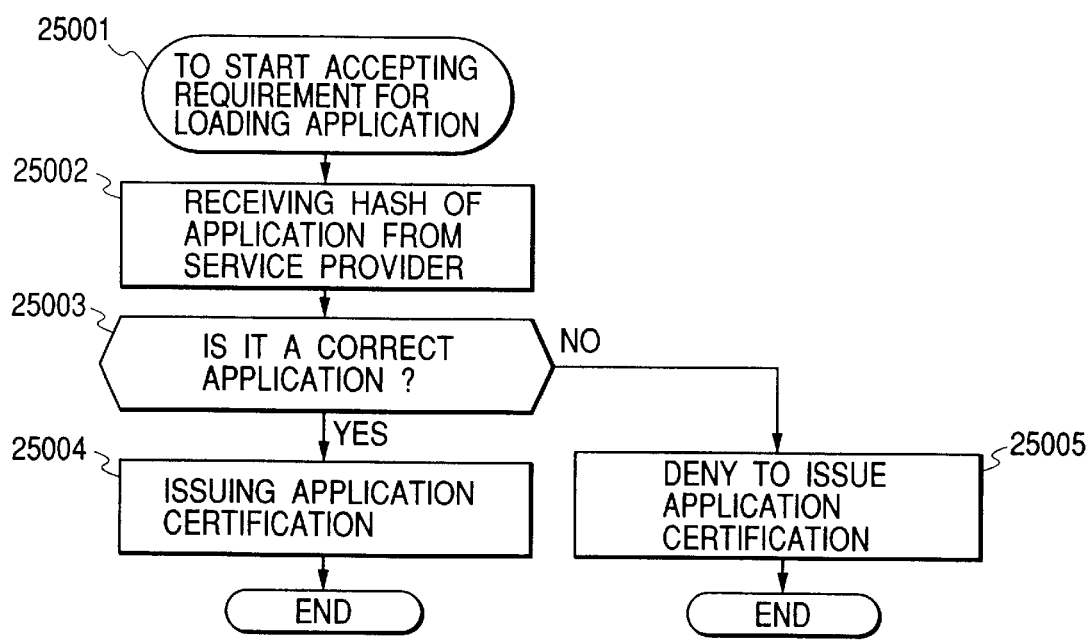
FIG. 22 is a diagram showing a sequence provided by the present invention to be followed by an agent for loading an application.

FIG. 22 shows a flowchart representing the procedure of processing carried out by an agent to receive a request to load an application into an IC card in accordance with the present invention.

At a step 25002, the agent receives a request to load an application into an IC card from a service provider. At the next step 25003, the agent verifies the validity of the contents of the application and the validity of the service provider in order to form a judgment as to whether or not the application can be loaded into an IC card.

If the application is found loadable, the flow of the processing goes on to a step 25004, at which the agent transmits an application authentication to the service provider. The application authentication is a combination of data encrypted by using a key of the agent and the agent certification, which was received from a card issuer when a pre-cooperation contract was made. The encrypted data represents a characteristic of the application such as a hash value of the application, which was received from the service provider. If the application is found unloadable, on the other hand, the flow of the processing goes on to a step 25005 at which the agent informs the service provider that the application cannot be loaded.

Service Provider: Typical Processing to Load a Security Domain

Figure 23:
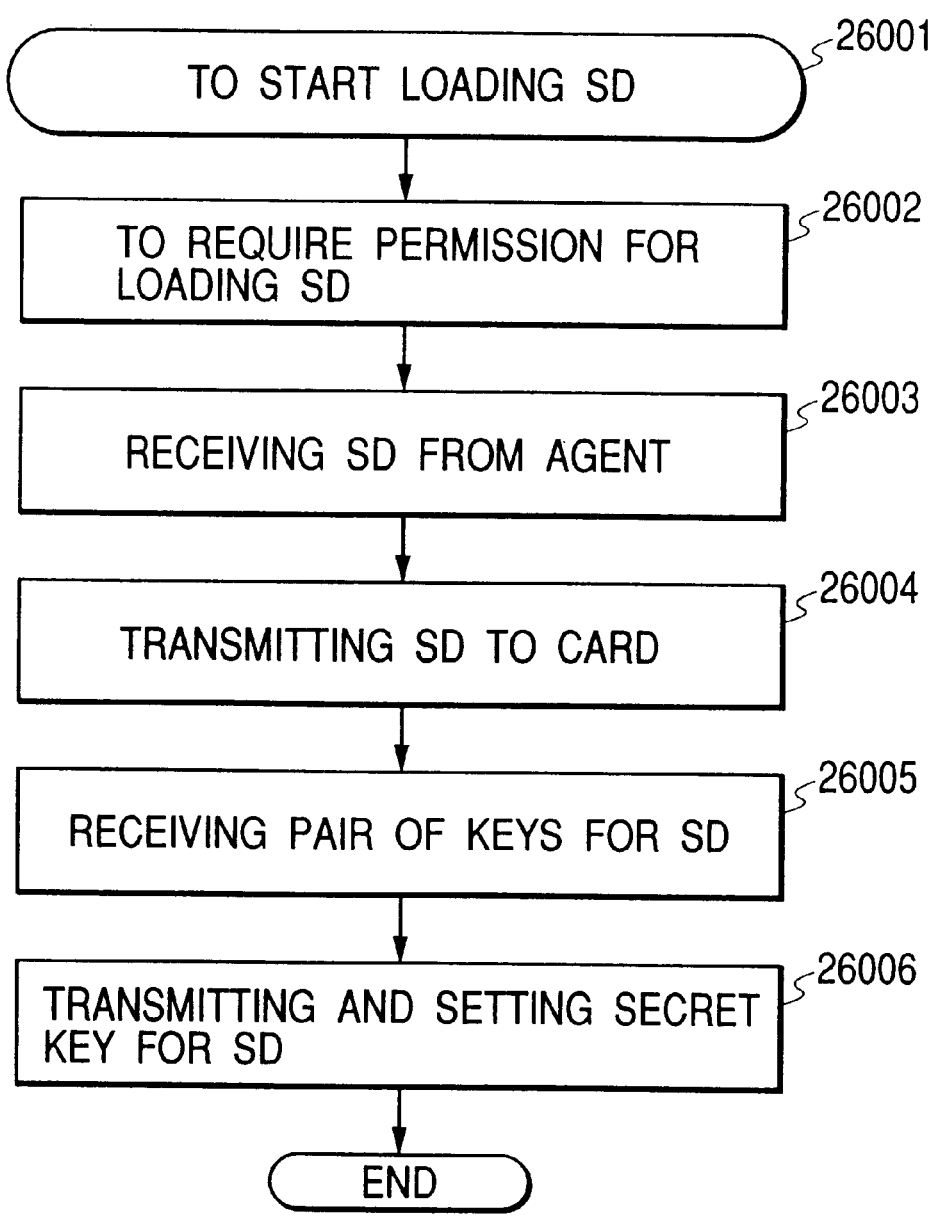
FIG. 23 is a diagram showing a sequence provided by the present invention to be followed by a service provider for loading a security domain.

FIG. 23 shows a flowchart representing the procedure of processing carried out by a service provider to load a security domain into an IC card in accordance with the present invention.

At a step 26002, the service provider requests an agent to load a security domain into an IC card. At the next step 26003, the service provider receives a security domain signed by a card issuer, and transmits the security domain to a card at a step 26004.

At the next step 26005, the service provider receives a pair of security-domain keys from the agent after the security domain has been set on the card.

At the next step 26006, the service provider transmits a security-domain secret key signed by the card issuer to the security domain to be set thereon.

Service Provider: Typical Processing to Load an Application

Figure 24:
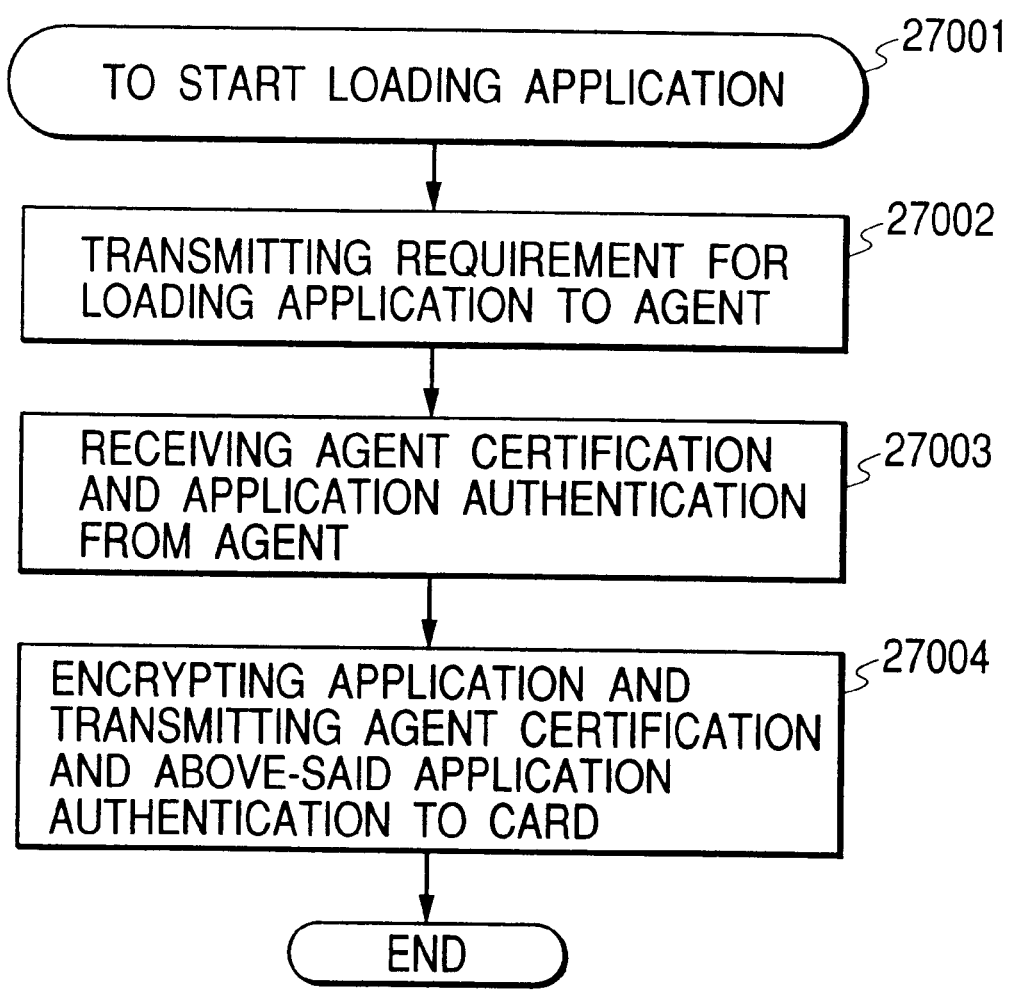
FIG. 24 is a diagram showing a sequence provided by the present invention to be followed by a service provider for loading an application.

FIG. 24 shows a flowchart representing the procedure of processing carried out by a service provider to load an application into an IC card in accordance with the present invention.

At a step 27002, the service provider requests an agent to give permission for loading an application into an IC card by transmitting typically a hash value of the application to the agent. At the next step 27003, the service provider receives an application authentication from the agent.

At the next step 27004, the service provider encrypts the application by using a key corresponding to a key set on the security domain and transmits the encrypted application to the IC card along with the application authentication.

What is described above is the procedure of processing carried out by a service provider to load an application into an IC card in accordance with an application loading method provided by the present invention.

The following description explains a variety of IC-card forms implementable by using the present invention and a variety of ways to operate the IC card.

As is obvious from the sequence shown in FIG. 9, according to the system provided by the present invention, the agent 901 carries out a proxy business on behalf of the A card issuer 302. If the proxy business is carried out by an agent 901 other than the A card issuer 302, not only is a service provider making a contract with the A card issuer 302 capable of loading an application onto the A card 11, but a service provider making a contract with the other card issuer 901 is also capable as well. That is to say, the present invention can be used by constructing a structure comprising the existing card issuer and a service provider.

In addition, a card issuer is capable of serving as an agent of another card issuer and vice versa. In this case, an application of a service provider can be loaded onto a card of either the card issuer. Moreover, by utilizing the method provided by the present invention, collaborative operations among existing card operation management systems can be carried out.

The following description explains some concrete applications of the card system provided by the present invention.

The first application is a tenant business. The tenant business is explained by referring to FIG. 25 as an application of the present invention. A tenant business in this specification is a business to manage tenants, that is, a business to rent a partial area in an IC card to a tenant business enterprise other than the card issuer.

Figure 25:
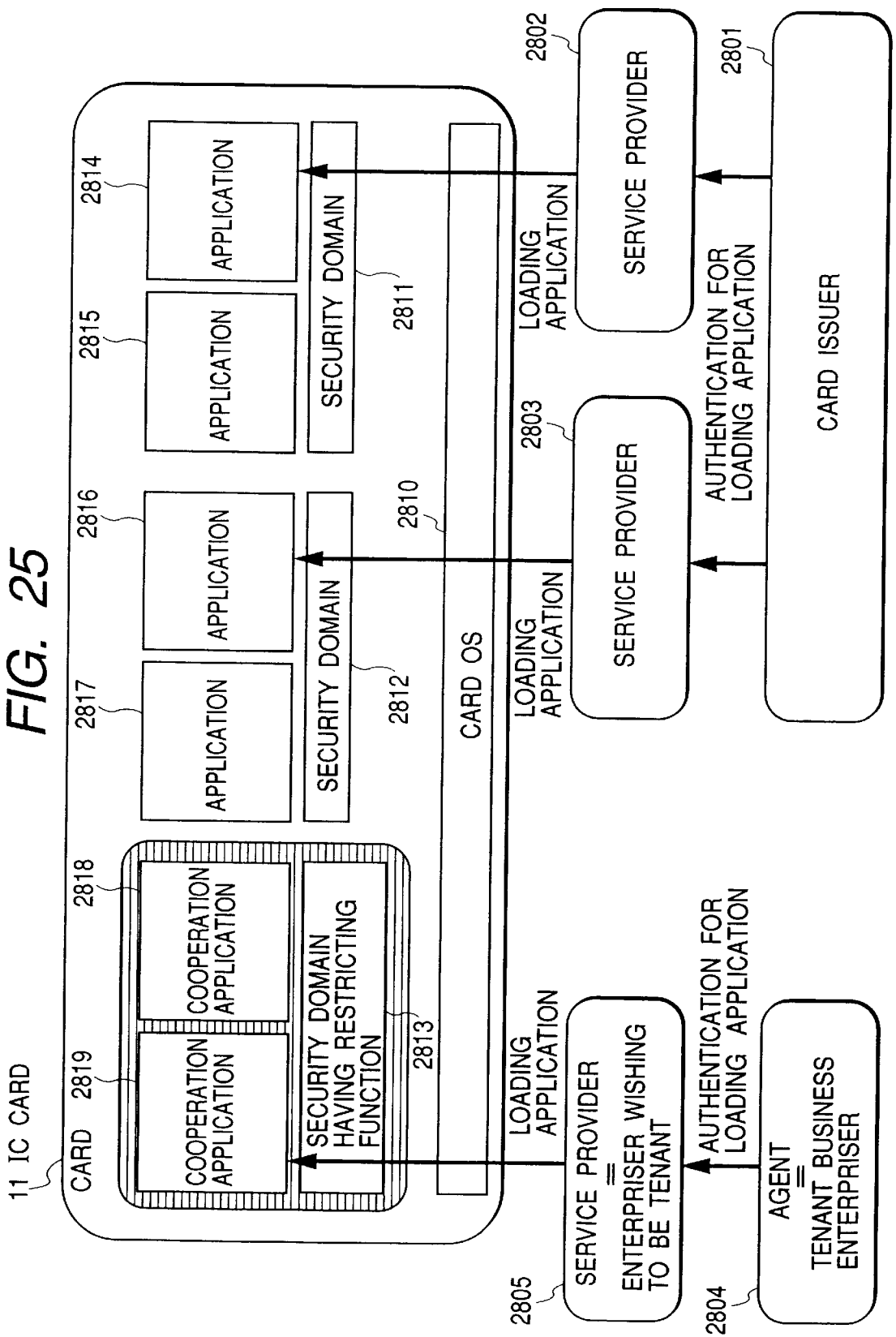
FIG. 25 is a diagram showing a typical tenant using the present invention.

FIG. 25 is a diagram showing a concept of operating a partial area in an IC card. In this embodiment, an application related to a cooperation business is loaded on the IC card by using a message signature of an agent and a security domain with a restricting function, which are provided by the present invention.

The embodiment is explained by referring to FIG. 25. A card issuer 2801 is a business enterprise fully responsible for IC-card related businesses including issuance of an IC card 11. The card issuer 2801 makes a contract with a service provider 2802 and a service provider 2803 to give permission for loading their respective applications into the IC card 11. In addition, this embodiment includes a tenant business enterprise 2804, which gives a tenant-desiring enterprise 2805 an authentication of an operation to load an application of the tenant-desiring enterprise 2805. Receiving such an authentication, the tenant-desiring enterprise 2805 is allowed to load an application thereof into a corporation application area of the IC card 11. Thus, the tenant-desiring enterprise 2805 corresponds to the service provider cited in the description given so far. On the other hand, the tenant business enterprise 2804 corresponds to the agent cited in the description given so far.

Also loaded in the IC card 11 is a card OS 2810, which allows a plurality of applications to be loaded and has a dynamic-loading function. The card OS 2810 executes functions of the IC card 11. Security domains 2811 and 2812 are set on the card OS 2810. To be more specific, reference numerals 2811 and 2812 denote security domains of the service providers 2802 and 2803 respectively.

The service provider 2802 loads its applications 2814 and 2815 into the IC card 11 through the security domain 2811. By the same token, the service provider 2803 loads its applications 2816 and 2817 into the IC card 11 through the security domain 2812. The service provider 2805 making a cooperation contract with the agent 2804 is capable of loading an application into the IC card 11 through a security domain 2813 having a restriction function. In the embodiment, the service provider 2805 loads applications 2818 and 2819. The restricting function of the security domain 2813 controls applications loaded through the security domain 2813. To put it concretely, an area represented by a hatched block in the figure is an area controlled by the security domain 2813.

In the configuration shown in the figure, the agent 2804 gives permission for loading an application. Thus, the agent 2804 rents a loading area from the card issuer 2801 and rents the area to service providers including the service provider 2805. If this configuration is compared with a tenant business enterprise renting a floor from a building owner and advertising for tenants, the IC card 11 and an area in the IC card 11 correspond to the building and a floor in the building respectively. Thus, the IC issuer 2801 owning the IC card corresponds to the building owner. On the other hand, the agent 2804 renting an area in the IC card 11 from the card issuer 2801 corresponds to the tenant business enterprise renting a floor of the building from the building owner. The service provider 2805 rendering services in the area corresponds to a tenant occupying the floor for some purposes. Thus, the agent 2804 needs to have a function as a middle man making a contract with the service provider 2805.

The above embodiment is a form of application of the present invention wherein some predetermined areas of the IC card are rented to the tenant business enterprise. The actual operations carried out by the agent and the service provider to load an application are the same as the general operations of the present invention explained so far.

Figure 26:
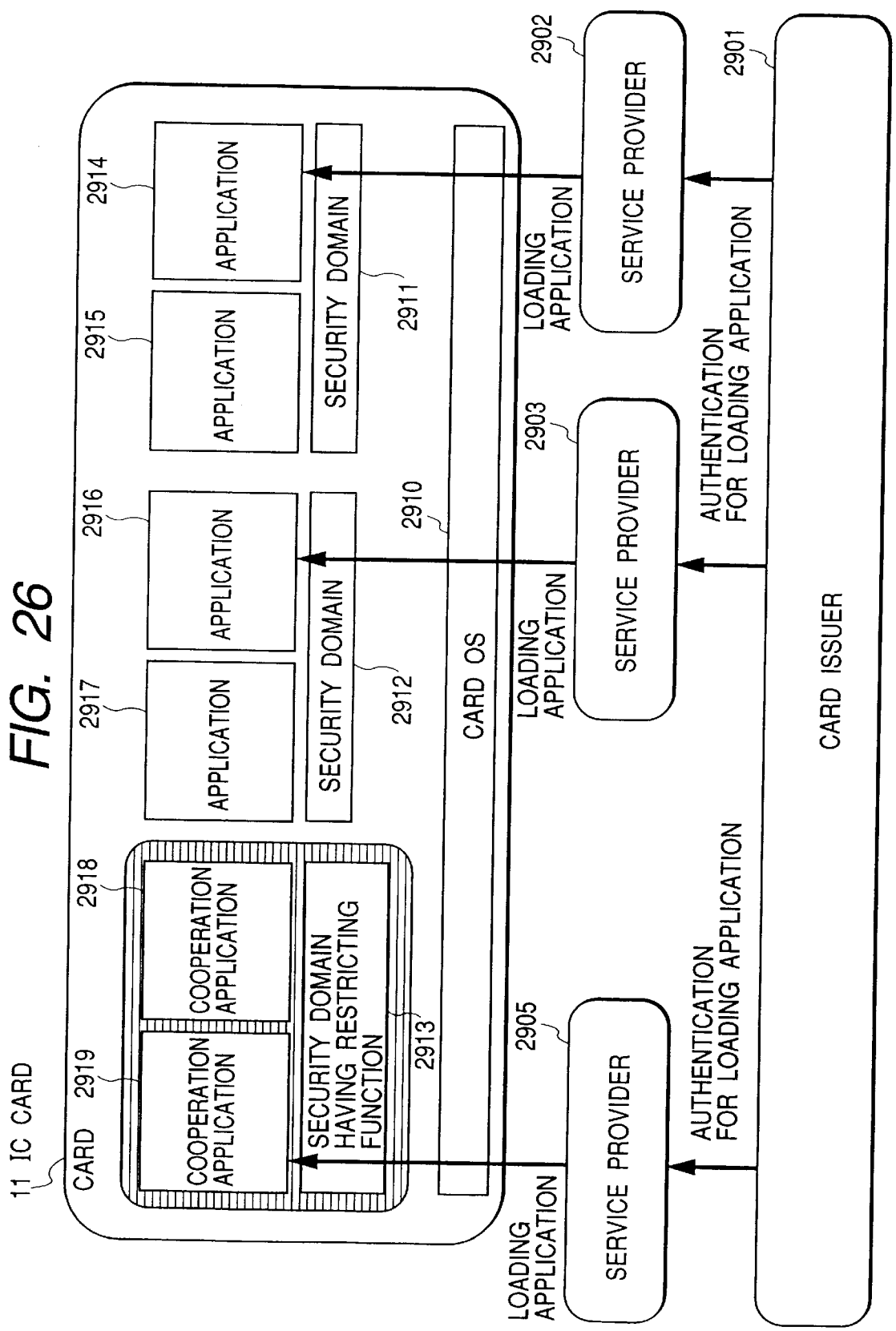
FIG. 26 is an explanatory diagram showing an example of making a contract for rendering restricted services using the present invention.

FIG. 26 is an explanatory diagram showing an embodiment wherein a card issuer 2901 associates a service provider 2905 in a relationship contract with a security domain 2913 having a restricted function. This embodiment is different from the embodiment shown in FIG. 25 in that, in this embodiment, the agent 2804 does not exist between the card issuer 2901 and the service provider 2905. The rest is the same as the embodiment shown in FIG. 25.

A merit offered by this embodiment is an increased degree of security obtained in online authentication during an operation to load an application. As already described earlier, in the case of the conventional system, in general, the service provider requests an authentication from the card issuer in an operation to load an application into an IC card. As a technique to make a request for authentication, there are online authentication carried out on an as-needed basis or online authentication carried out as a batch operation. In the former technique, each time such a request is made, a communication through a network is established. With the latter technique, on the other hand, a number of permits to load applications are acquired from the card issuer in advance. In the case of either online authentication technique, there is raised a problem of the card issuer's weakened control of the IC card. By setting restrictions in a security domain with a restricting function loaded on the IC card, however, this problem can be put under control. In addition, a difference in loading power among service providers each making a contract can be set, making it possible to make a contract according to the reliability of a service provider.

Next, a virtual card of IC cards is explained. A virtual card is an application of IC cards provided by the present invention.

Figure 27:
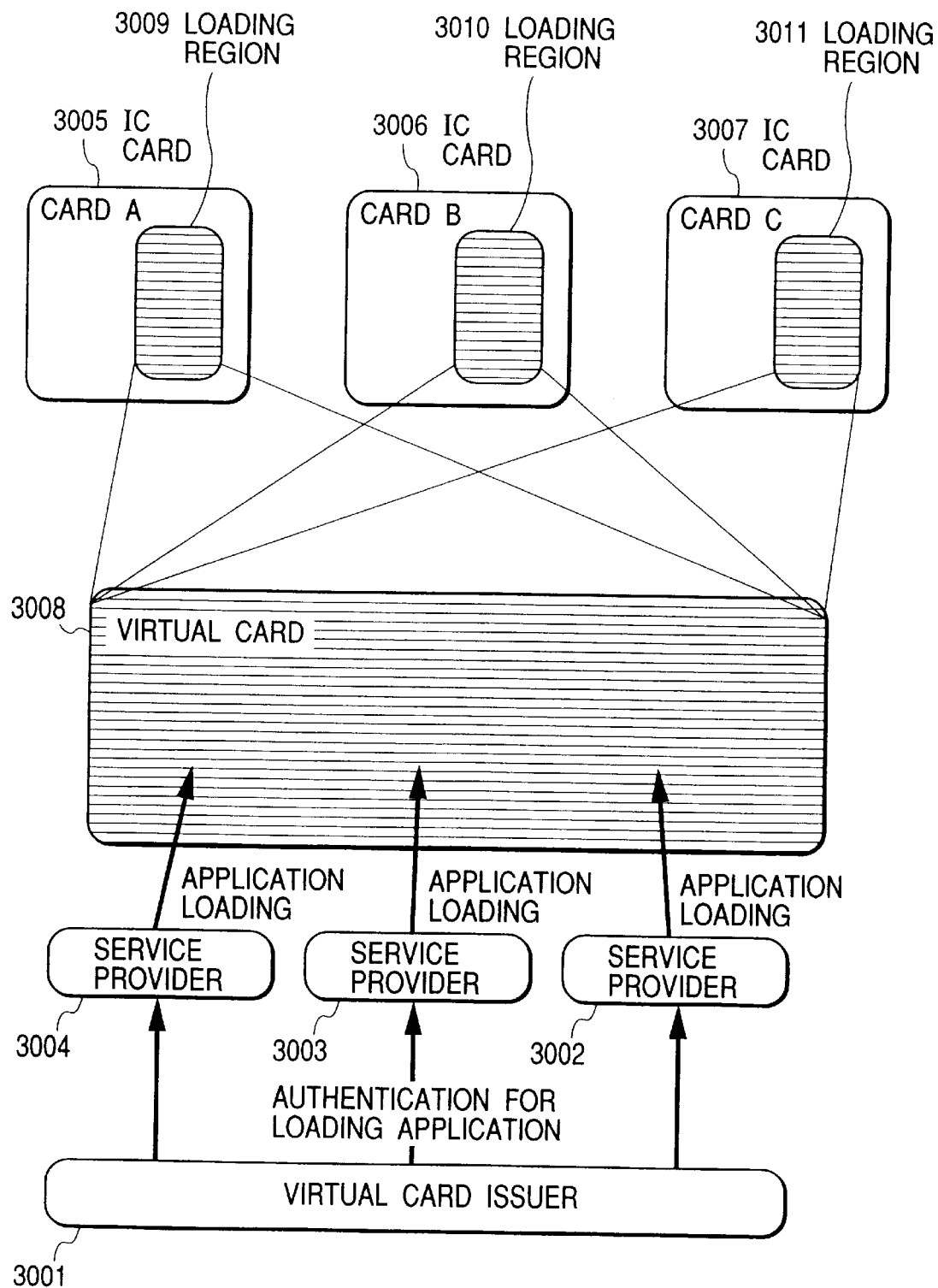
FIG. 27 is an explanatory diagram showing a typical virtual card using the present invention.
Figure 28:
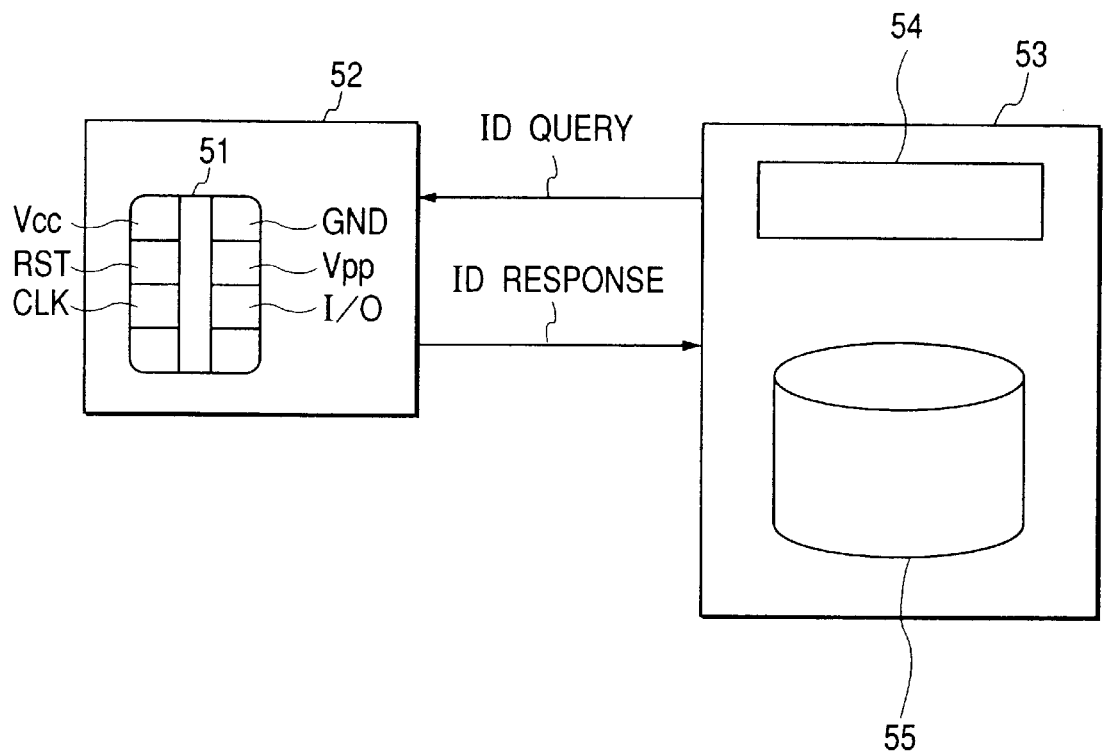
FIG. 28 is an outline diagram of a card system.

FIG. 27 is an explanatory diagram showing the concept of a virtual card. A virtual card makes a plurality of IC cards, which may have been issued by different card issuers, appear to service providers as a single card under integrated control of the IC cards executed by a third party. To be more specific, service providers load applications for the respective IC cards into the IC cards through a third party in the same way as if each of the applications were loaded into an application area of a single IC card, namely, the virtual card. Thus, the service providers are capable of using a plurality of IC cards in the same way as if only one IC card were used.

In the embodiment shown in FIG. 27, an A card 3005, a B card 3006 and a C card 3007 are different IC cards with card issuers thereof each making a cooperation contract with the third party 3001. In the following description, the third party 3001 is referred to as a virtual-card issuer to make the description more explanatory. Since the virtual-card issuer 3001 rents an application loading area in the A card 3005, the service providers 3002, 3003 and 3004 each making a contract with the virtual-card issuer 3001 are each allowed to load an application into the application loading area in the A card 3005 provided that loading conditions are satisfied. By the same token, the service providers 3002, 3003 and 3004 each making a contract with the virtual-card issuer 3001 are each allowed to load an application into an application loading area in the B card 3006 or the C card 3007. That is to say, in spite of the fact that the virtual-card issuer 3001 does not do the actual card-issuing business, the virtual-card issuer 3001 conceptually issues a virtual card 3008, which can be regarded as a card allowing the service providers 3002, 3003 and 3004 to load applications into application loading areas in the A card 3005, the B card 3006 and the C card 3007 if there has been made a contract between each of the service providers 3002, 3003 and 3004 and the virtual-card issuer 3001. To a service provider, only one card issuer is required to make a contract with and to establish a communication to in order to load applications into a plurality of cards. As a result, both the labor and the cost can be reduced substantially.

The above description of the present invention can be summarized into the following essentials.

In accordance with the present invention, without obtaining permission for loading an application into an IC card directly from the issuer of the IC card, a service provider is capable of loading an application into the IC card with the same high degree of security as loading directly permitted by the card issuer. Thus, by eliminating the need to establish direct communication between a card issuer and a service provider serving as a cooperation partner and by letting cooperation contracts be made among card issuers, it is possible to solve problems that will arise in consequence of the popularization of the IC card and the increased number of users in the future. As a result, the present invention allows flexible services to be provided to an IC card. It should be noted that the problems arising in consequence of the popularization of the IC card and the increased number of users are classified into the following first and second categories. The problem of the first category is caused by a large number of contracts made between card issuers and service providers and a large amount of communication traffic between the card issuers and the service providers. On the other hand, the problem of the second category is a problem among business enterprises that are practically incapable of making a contract.

In addition, there are also two problems arising in consequence of the use of an agent to solve the above problems. The first problem is a risk of loading an unlimited number of applications into IC cards once an agent certification is issued. The second problem is the need to make a cooperation contract to handle a limited size of a loading area. Using a security domain having a restricting function can solve these problems.

Moreover, by adopting the application loading method provided by the present invention, new ways of utilizing an IC card become possible.

The new ways of utilizing an IC card are listed as follows:
1: A method of applying an IC card to an existing system
2: A mutual operating method for carrying out agent businesses among card issuers themselves
3: A tenant business of renting and operating an area on an IC card
4: Setting a difference in application loading among service providers by a card issuer
5: Virtual-card issuing business In accordance with the first embodiment provided by the present invention, without obtaining permission for loading an application into an IC card directly from the issuer of the IC card, a service provider is capable of loading an application into the IC card with the same high degree of security as loading directly permitted by the card issuer. In addition, the first embodiment of the present invention is capable of solving complexities of various kinds of actual processing caused by an increasing number of contracts made between card issuers and service providers as well as an increasing amount of communication traffic between the card issuers and the service providers.

The second embodiment of the present invention is capable of solving the problem of loading an unlimited number of applications into IC cards without obtaining permission for loading an application into an IC card directly from the issuer of the IC card.

List of Reference Numerals

In order to make the drawings easy to understand, main reference numerals used in the drawings are explained as follows.

11: IC card
101: Hardware layer in an IC card
102: OS layer in an IC card
106: Application loaded in an IC card
107: Application layer in an IC card
108: Security domain
302: Card-issuer server
303: Service-provider server
304: External terminal for a client
305: Card-issuer data base
306: Service-provider data base
801 and 802: Applications
804 and 805: Security domains
803: Service provider
901: Agent
902: Agent data base
2801: Card issuer
2802 and 2803: Service providers
2804: Agent or tenant business enterprise
2805: Service provider or tenant-desiring enterprise
2810: Card OS
2811 and 1812: Security domains
2813: Security domain with a restricting function
2814 to 2819: Applications
2901: Card issuer
2902, 2903 and 2905: Service providers
2904 and 2910: Card OS
2911 and 2912: Security domains
2913: Security domain with a restricting function
2914 to 2919: Applications
3001: Virtual-card issuer
3002 to 3004: Service providers
3005 to 3007: IC cards
3009 to 3011: Loading areas for cooperation partners There are a number of aspects of the present invention. The following is a summary of principal aspects.

In accordance with a first aspect of the present invention, there is provided a message-signature-generation and message-signature-verification method using an IC card having an encryption function based on an asymmetry key algorithm, the message-signature-generation and message-signature-verification method comprising the steps of:

driving an IC-card issuer to store a public key of its own in an IC card and distribute the IC card to users;

driving the IC-card issuer to receive a public key of a third party referred to hereafter as an agent, put an issuer signature to the public key of the agent by using a secret key of the IC-card issuer and return the signed public key of the agent to the agent;

driving the agent to put an agent signature to data by using a secret key of the agent;

driving the agent to transmit the public key of the agent, which was received from the IC-card issuer and has the issuer signature put thereto by the IC-card issuer by using the secret key of the IC-card issuer, to the IC card along with the data;

driving the IC card to verify the public key of the agent with the issuer signature put thereto by the IC-card issuer by using the secret key of the IC-card issuer; and driving the IC card to verify the agent signature put to the data by using the secret key of the agent in order to authenticate validity of the data.

In accordance with a second aspect of the present invention, there is provided an application loading method comprising the steps of:

driving an IC-card issuer to store a public key of its own in an IC card and distribute the IC card to users;

driving the IC-card issuer to receive a public key of an agent, put an issuer signature to the public key of the agent by using a secret key of the IC-card issuer and hand over the signed public key of the agent to the agent as an agent certification;

driving a business enterprise referred to hereafter as a service provider doing a business of loading an application into the IC card to transmit data representing a characteristic of the application such as a hash value of the application to the agent;

driving the agent to put a signature to the characteristic of the application such as a hash value received from the service provider by using a secret key of the agent;

driving the agent to return a combination of the signed characteristic of the application such as a hash value and the agent certification to the service provider as an application authentication;

driving the service provider to load a combination of the application and the application authentication into the IC card;

driving the IC card to verify the agent certification by using a public key of the IC-card issuer stored in the IC card;

driving the IC card to verify the signed characteristic of the application such as a hash value by using the verified public key of the agent, that is, the verified agent certification;

driving the IC card to compute a hash value of the application; and driving the IC card to compare the verified hash value with the computed hash value in order to verify validity of the application.

In accordance with a third aspect of the present invention, an IC card includes a security domain, which is an application or data for loading, deletion and management of applications on the IC card, wherein:

the security domain is created by an IC-card issuer;

a predetermined restriction on application loading can be set in the security domain by the IC-card issuer;

the security domain is loaded onto the IC card by a service provider;

the service provider sets a secret key of an agent in the security domain later on;

when an application is loaded onto the IC card, validity of a signature put to a public key owned by the agent is verified by using a public key of the IC-card issuer stored in the security domain; and the public key of the agent is used for verifying validity of a signature put to a hash value of the application in order to verify validity of the application.

In accordance with a fourth aspect of the present invention, there is provided an application loading method for loading an application into an IC card by adopting the message-signature-generation and message-signature-verification method according to the first aspect and utilizing the security domain, the application loading method comprising the steps of:

driving the IC-card issuer to hand over the agent certification and the security domain with a predetermined restriction set therein to the agent;

driving the agent to hand over the security domain and a key for the security domain to the service provider;

driving the service provider to store the security domain in the IC card and setting a key therein;

driving the service provider to issue a request for an application authentication to the agent and receive the application authentication from the agent;

driving the service provider to load a combination of the application authentication and the application into the IC card; and driving the IC card to verify validity of the application authentication in order to verify validity of the application.

In accordance with a fifth aspect of the present invention, there is provided an IC card capable of loading an application, the IC card comprising:

a means for storing a security domain received from a service provider;

a means for setting a key in the security domain in conjunction with the service provider;

a means for verifying validity of an application authentication attached to the application in an operation to load the application; and a means for installing the application.

In accordance with a sixth aspect of the present invention, there is provided an IC-card issuer for executing the steps of:

receiving a public key from an agent serving as a third party other than the IC-card issuer itself;

putting a signature to the public key by using a secret key of the IC-card issuer's own;

returning the signed public key to the agent as an agent certification;

creating a security domain according to claim 7 and setting a condition on the security domain; and handing over the security domain to the agent.

In accordance with a seventh aspect of the present invention, there is provided an enterprise (or an agent) serving as a proxy for carrying out part of a business to manage issuance of IC cards by execution of the steps of:

handing over a public key of the agent's own to a card issuer;

receiving an agent certification with a signature of the IC-card issuer put thereto by the IC-card issuer by using a secret key from the IC-card issuer;

receiving a security domain from the IC-card issuer;

handing over the security domain and a key for the security domain to a service provider;

receiving data representing a characteristic of an application such as a hash value of the application from the service provider; and putting a signature of the agent's own to the data by using a secret key and returning a combination of the signed data and the agent certification to the service provider as an application authentication.

In accordance with a eighth aspect of the present invention, there is provided a service provider for:

receiving a security domain according to claim 7 and a key for the security domain from an agent carrying out a proxy business of an IC-card issuer;

storing the security domain in an IC card and setting a key therein;

transmitting data representing a characteristic of an application to be loaded onto the IC card such as a hash value of the application to the agent;

receiving a combination of an agent certification and the data representing a characteristic of an application to be loaded onto the IC card such as a hash value of the application from the agent as an application authentication wherein a signature was put by the agent to the data by using a secret key of the agent; and transmitting a combination of the application authentication and the application to the IC card.

In accordance with an ninth aspect of the present invention, there is provided an IC-card mutual operating method among IC-card issuers whereby business enterprises (the IC-card issuers?) carry out IC-card issuing management businesses at the same time, and are each capable of issuing an application authentication to an IC card issued by any of the IC-card issuers receiving an agent certification in addition to an application authentication to an IC card issued by itself.

In accordance with a tenth aspect of the present invention, there is provided an IC-card mutual operating method among IC-card issuers each issuing an IC card whereby the IC-card issuers are each capable of issuing an application authentication to an IC card issued by any of the IC-card issuers due to the fact that the IC-card issuers are each an agent.

In accordance with an eleventh aspect of the present invention, there is provided a business to:

operate partial areas on an IC card;

pay a rent for renting each of the partial areas on the IC card to a card issuer; and request a service provider to pay a fee for jobs such as loading an application and responding to inquiries.

In accordance with a tenth aspect of the present invention, there is provided an application loading method of loading an application onto an IC card using a function of a security domain, wherein, a service provider is capable of loading an application only through the security domain;

a condition is set in the security domain by a card issuer in accordance with a contract made with the service provider; and an application loading condition on the same IC card varies from service provider to service provider in dependence on a condition for each service provider.

In accordance with a twelfth aspect of the present invention, there is provided an IC-card issuing management proxy business wherein:

an agent serves as a proxy for a plurality of IC-card issuers;

the agent receives a request to load an application from a service provider;

the agent transmits an application authentication with a plurality of attached agent certifications issued by the IC-card issuers to the service provider; and the service provider is capable of loading an application into a plurality of IC cards by using the application authentication received from the agent.

A 13th aspect of the present invention is an IC-card mutual operating system among IC-card issuers whereby business enterprises carry out IC-card issuing management businesses at the same time, and are each capable of issuing an application authentication to an IC card issued by any of said IC-card issuers receiving an agent certification in addition to an application authentication to an IC card issued by itself.

The 14th aspect is an IC-card mutual operating method among IC-card issuers each issuing an IC card whereby said IC-card issuers are each capable of issuing an application authentication to an IC card issued by any of said IC-card issuers due to the fact that said IC-card issuers are each an agent.

The 15th aspect is a business carried out by an agent for IC card issuing management businesses, characterized by operating partial areas on an IC card;

paying a rent for renting each of said partial areas on said IC card to a card issuer; and requesting a service provider to pay a fee for jobs such as loading an application and responding to inquiries.

The 16th aspect is an application loading method of loading an application onto an IC card using a function of a security domain, wherein, a service provider is capable of loading an application only through said security domain;

a condition is set in said security domain by a card issuer in accordance with a contract made with said service provider; and an application loading condition on the same IC card varies from service provider to service provider in dependence on a condition for each service provider.

The 17th aspect is an IC-card issuing management proxy business wherein:

an agent serves as a proxy for a plurality of IC-card issuers;

said agent receives a request to load an application from a service provider;

said agent transmits an application authentication with a plurality of attached agent certifications issued by said IC-card issuers to said service provider; and said service provider is capable of loading an application into a plurality of IC cards by using said application authentication received from said agent.

What is claimed is:

1. A method of loading an application onto an IC card comprising the steps of:

transferring an asymmetrical key and a public key of an agent to make a request for an agent certification from the agent to the card issuer, transmitting the agent certification from the card issuer to the agent, a signature being put to the agent certification by using an asymmetrical public key owned by card issuer for the public key received from the agent;

requesting permission for loading the application onto the IC card from the service provider to the agent;

checking, by the agent, the contents of the application which was filed for permission by the service provider in order to verity the validity of the application by the agent;

putting a signature to the hash value of the application received from the service provider by using an asymmetrical secret key and returning the signed hash value along with the agent certification from the service provider to the agent; and transmitting a combination of the hash value of the application received from the agent, the agent certification and the application itself from the service provider to the IC card, the IC card including a public key of the card issuer and confirming its validity.

2. A method of loading an application onto an IC card comprising the steps of:

transmitting an asymmetrical public key of the agent to request an agent certification from the card issuer to a card issuer;

putting, by a card issuer, an asymmetrical secret key to an agent certification and transmitting the agent certification from the card issuer to the agent;

creating a pair of asymmetrical keys for the security domain in the agent and transmitting the blinded security key to the card issuer;

putting a signature to the secret key, which was subjected to the blinding process in the agent, and returning the signed secret key back to the agent;

creating, in the card issuer, a security domain setting a restricting condition according to the cooperation contact in the security domain, and storing a security domain public key of the card issuer or setting the security domain public key in a security domain created in advance in accordance wit the cooperation contract;

putting, in the card issuer, a signature to the security domain by using a secret key of the card issuer;

sending the signed security domain to the agent as a security domain having a restricting function;

sending a request for permission for loading a security domain from the service provider to the agent;

transmitting the security domain with a restricting function from the agent to the service provider;

transmitting a pair of security-domain keys to the service provider, the pair of keys consisting of a signed secret key and a public key corresponding to the signed secret key;

storing, by the service provider, the security domain having a restricting function into the IC card;

sending a security-domain secret key from the service provider to the IC card, if the validity being verified;

verifying the validity of this key in the IC card;

sending, from the service provider to the agent, a request for permission for loading an application into the IC card;

putting a signature of the agent to the hash value of the application received from the service provider;

transmitting the signed hash value from the agent to the service provider;

verifying the signature of the agent certification in the security domain;

decrypting the application by the secret key and fetching the hash value;

determining the validity of the hash value of the application; and loading the application in the IC card.

* * * * *